(12) United States Patent
Vegesna

(10) Patent No.: US 12,095,886 B2
(45) Date of Patent: Sep. 17, 2024

(54) ENTITY CARD UTILIZATION

(71) Applicant: Zoho Corporation Private Limited, Chengalpattu Taluk (IN)

(72) Inventor: Ramakrishna Raju Vegesna, Austin, TX (US)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 0 days.

(21) Appl. No.: 18/117,779

(22) Filed: Mar. 6, 2023

(65) Prior Publication Data

US 2023/0300221 A1 Sep. 21, 2023

Related U.S. Application Data

(60) Provisional application No. 63/341,303, filed on May 12, 2022.

(30) Foreign Application Priority Data

Mar. 18, 2022 (IN) .............................. 202241014964

(51) Int. Cl.
*H04L 67/63* (2022.01)
*G06F 3/04812* (2022.01)
*G06F 3/0482* (2013.01)
*G06Q 10/109* (2023.01)

(52) U.S. Cl.
CPC .......... *H04L 67/63* (2022.05); *G06F 3/04812* (2013.01); *G06F 3/0482* (2013.01); *G06Q 10/109* (2013.01)

(58) Field of Classification Search
CPC . G06F 3/04812; G06F 3/0482; G06Q 10/109; H04L 67/63
See application file for complete search history.

(56) References Cited

U.S. PATENT DOCUMENTS

| 9,262,053 B2 * | 2/2016 | Jegal ..................... G06F 3/0482 |
| 9,407,753 B2 * | 8/2016 | Howard ................ G06F 3/0484 |
| 10,387,539 B2 * | 8/2019 | Scapa .................... G06F 40/103 |
| 10,565,219 B2 * | 2/2020 | Gross .................... H04L 51/216 |
| 10,579,212 B2 * | 3/2020 | Gross ................. G06Q 10/1095 |
| 10,725,618 B2 * | 7/2020 | Jhaj ........................ G06F 3/0482 |
| 10,748,120 B2 * | 8/2020 | Sims .................. G06Q 10/1095 |
| 10,893,036 B2 * | 1/2021 | Chang ............... H04M 1/72436 |
| 11,032,390 B2 * | 6/2021 | Scapa ..................... H04L 67/10 |
| 11,460,976 B2 * | 10/2022 | Fan ...................... G06F 3/04817 |
| 2013/0332378 A1 * | 12/2013 | Brown ................... G06Q 50/01 705/319 |
| 2018/0020076 A1 * | 1/2018 | Porwal ................ H04L 67/1095 |

(Continued)

*Primary Examiner* — George C Neurauter, Jr.
(74) *Attorney, Agent, or Firm* — Ahmann Kloke LLP

(57) ABSTRACT

An entity-centric approach has been proposed to provide a consistent user experience in accessing a unified software applications suite effortlessly. Entities are connected with one another. The entities and the connectivity between them are reflected in all three functional layers of 3-tier client-server architecture. Every entity has a set of attributes and each attribute represents a data item or record of a particular type. The data items or records are represented in the form of card(s) as determined by contextualization and access control engines. The contextualization engine determines the origin of the user. The access control engine determines the access permission of every user.

20 Claims, 20 Drawing Sheets

(56) References Cited

U.S. PATENT DOCUMENTS

| | | | | |
|---|---|---|---|---|
| 2018/0060017 A1* | 3/2018 | Lauck | ................ | H04M 1/2757 |
| 2020/0134567 A1* | 4/2020 | Mandelli | ................ | G06Q 50/01 |
| 2023/0099324 A1* | 3/2023 | Wahl | ................ | G06F 3/04842 |
| | | | | 715/751 |
| 2023/0297594 A1* | 9/2023 | Vegesna | ................ | G06F 3/0483 |
| | | | | 707/805 |
| 2023/0325045 A1* | 10/2023 | Vegesna | ................ | G06F 3/0481 |
| | | | | 715/743 |

* cited by examiner

500

| UI Layer 502 | UI Process Component 508 | Customization Module 512 |
| | | UI Level ID Generator 514 |
| | | Design Element Creator 516 |
| | UI Component 510 | |
| Process Layer 504 | Contextual Module 518 | |
| | Access Control Module 520 | |
| | Logic Module 522 | |
| Data Layer 506 | Data Access Components 524 | |
| | Data Access Platform 526 | |

FIG. 5

ENTITY CARD UTILIZATION

CROSS-REFERENCE TO RELATED APPLICATIONS

The present application claims priority to Indian Provisional Patent Application No. 202241014964, entitled "METHOD AND SYSTEM TO PRESENT ENTITY RELATIONSHIP IN ENTITY-CENTRIC UNIFIED BUSINESS MODEL," and filed on Mar. 18, 2022, and claims priority to U.S. Provisional Patent Application No. 63/341,303, entitled, "METHOD AND SYSTEM TO PRESENT ENTITY RELATIONSHIP IN ENTITY-CENTRIC UNIFIED BUSINESS MODEL," filed on May 12, 2022, which is incorporated herein by reference in its entirety.

BACKGROUND

A software application bundle can be a set of software applications for common productivity tasks. These software application bundles are application-centric or application-oriented. Each software application in the bundle may have a distinct User Interface (UI). This becomes painful as the user has to access multiple applications. The user may face an inconsistency when accessing one or more application from the bundle.

SUMMARY

Making use of an entity-centric paradigm that includes entity "nodes" connected to one another via relationship "edges" in an organizational graph addresses problems with app-centric approaches. A user, who is also represented as an entity in the organization graph, can readily navigate the organizational graph in accordance with their own relationships with target entities and the target entities' relationships with one another. Applications are moved to the background and are exposed in accordance with relevant context.

BRIEF DESCRIPTION OF THE DRAWINGS

FIG. 5 is a diagram of functional layers and components of an example of a unified software suite.

DETAILED DESCRIPTION

A unified software suite is a patchwork/bundle/collection of cloud applications, legacy tools, and other applications bundled together to transform an organization's disparate activities into a more connected and agile organization, thereby increasing productivity across the organization, delivering better customer experiences, and much more. It is apt to call it a "single operating system" for the organization. It acts as a powerful tool to pull data from various applications of the unified software suite and visualize them on a single screen thus providing valuable insights with respect to the organization. ZOHO ONE™ is an example of a system that bundles software applications like ZOHO Mail™, ZOHO CRM™, ZOHO Cliq®, ZOHO Books™, ZOHO Document™, etc.

A unified software suite functions poorly as a bundle of applications with an app-centric approach. Building a software application with an app-centric approach, is becoming complex as it not only monitors a set of hosts, it also has to monitor sources of data. In this paper, sources of data that are to be monitored are referred to as entities. A software application with "entity-centric" approach allows a user to connect to the data to understand increasingly complex and interdependent systems in the context of organizational operations. It's an improvement to "app-centric" in the unified software suite context because any complex modern software application has to deal with much more than just applications. Changing from the app-centric approach to an entity-centric approach is a solution. The unified software suite with an entity-centric approach provides a consistent user experience in accessing bundled software applications effortlessly.

An entity is used to model and manage data in a software application. Examples of entities for building such software application include accounts, contacts, employees, activities, etc. Every entity has a set of attributes and each attribute represents a data item or record of a particular type. For example, the "account" entity has attributes like name, address, etc. For instance, if an entity is implemented in a database table, the entity attributes may correspond to table columns.

Figure 1:
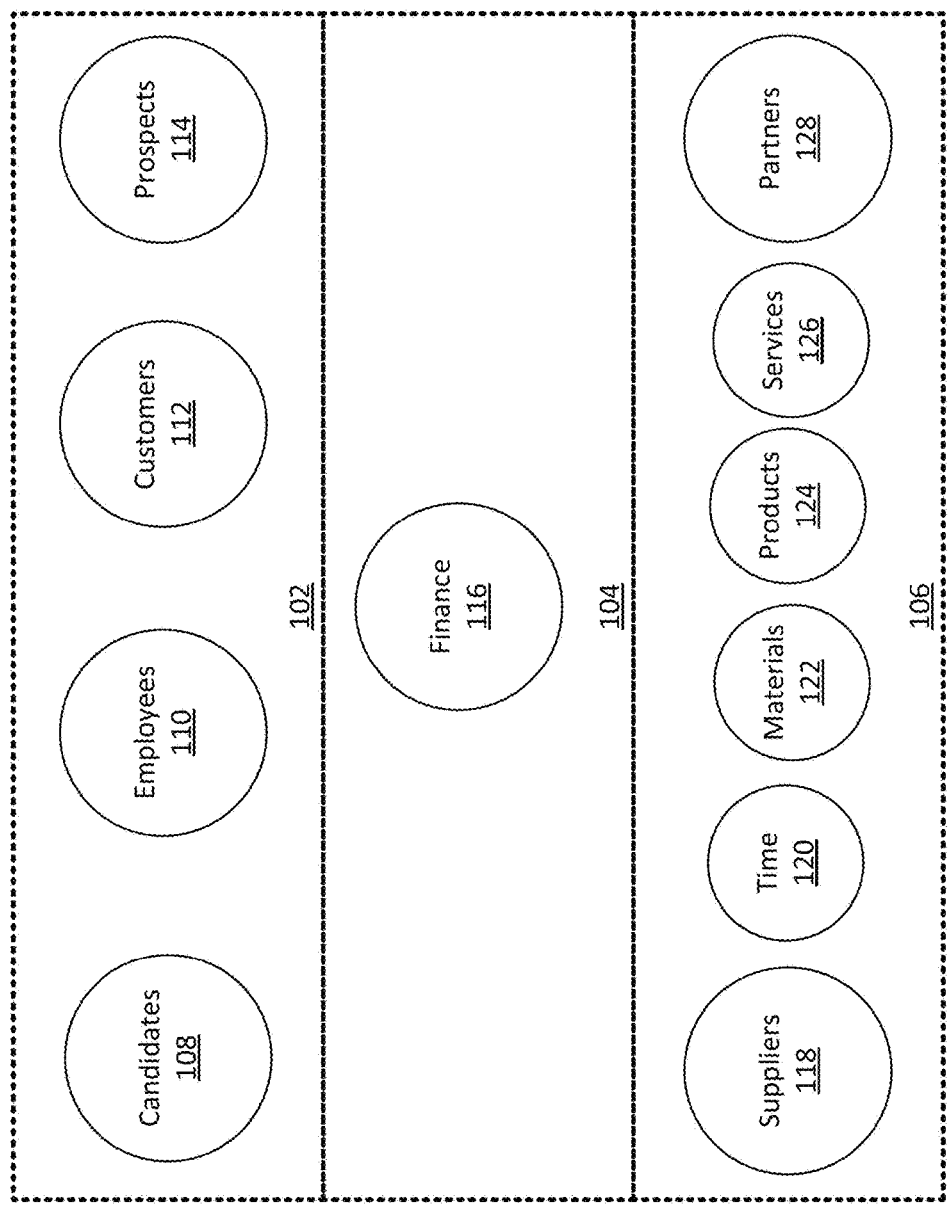
FIG. 1 is a diagram of essential entities for an example of a unified software suite.

FIG. 1 is a diagram 100 of essential entities for an example of a unified software suite. In this example, a consumer group 102 includes candidate entities 108, employee entities 110, customer entities 112, and prospect entities 114. The candidate entities 108 and prospect entities 114 feed into the employee entities 110 and customer entities 112. The deliverables group 106 includes supplier entities 118, time entities 120, material entities 122, product entities 124, service entities 126, and partner entities 128. Entities like the "prospects" and "customers" entities are consumers of "products" and "services" entities, which are offered/created using entities like "time" and "materials". The entities "products" and "services" are supplied through the "suppliers" entities, and sold through "partners" entities. The process is enabled by a finance entity 116 in a finance group 104. In a specific implementation, all these entities are reflected in an organizational graph by including a separate module for all these entities. Some of the entities, like "employees", "customers", "finance", "time", "materials", "products", and "services" are closely linked within an organization; the other entities are outside. In the example of FIG. 1, the "finance" entity is in the middle, but the central entity could be "customer" or some other entity selected by an administrator or user in accordance with their preferences or requirements.

Figure 2:
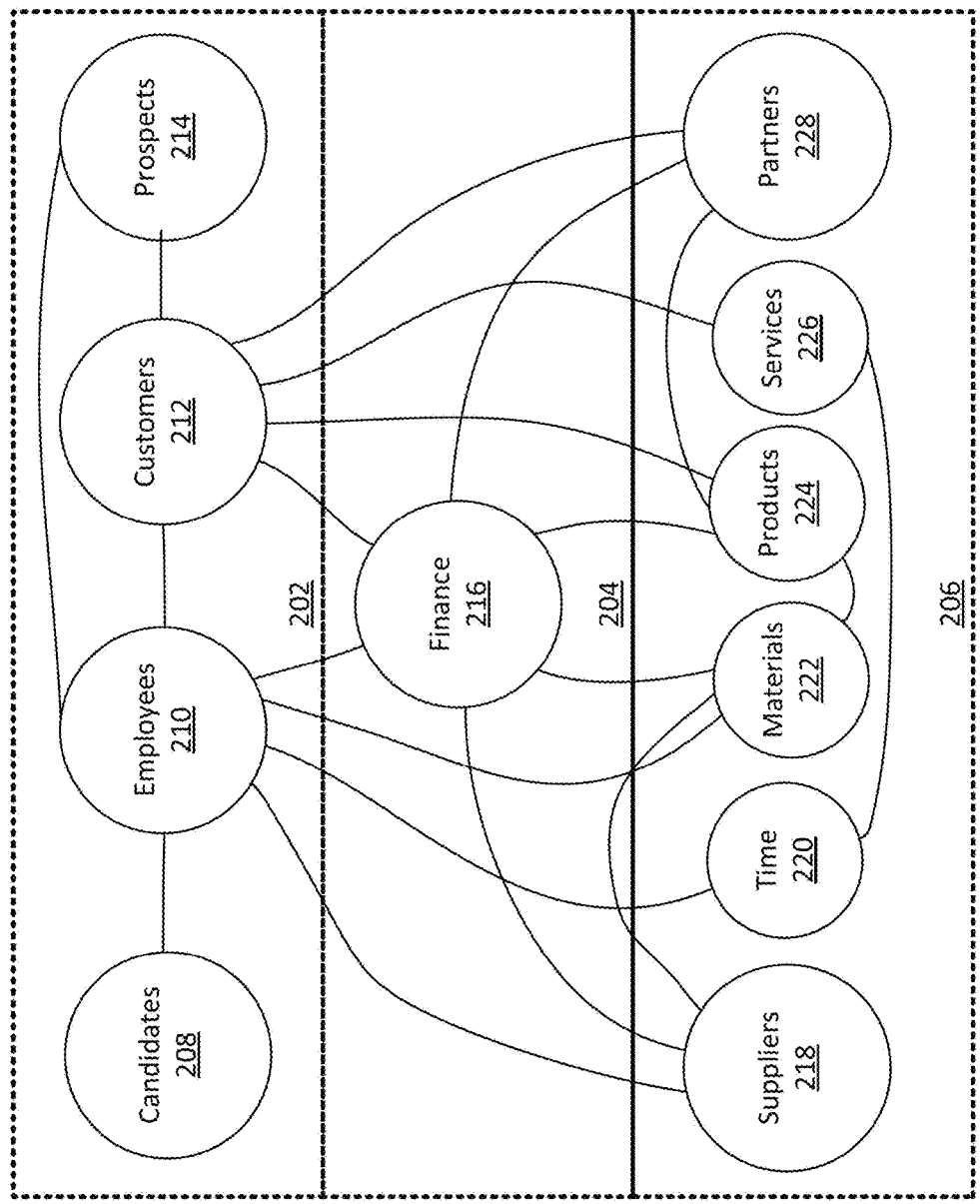
FIG. 2 is a diagram connections between entities of an example of a unified software suite.

FIG. 2 is a diagram 200 of connections between entities of an example of a unified software suite. The groups 202, 204, and 206 are equivalent to the groups 102, 104, 106. The entities 208-228 are equivalent to the entities 108-128. In a specific implementation, every entity is connected to all other entities in an organizational graph, either directly or indirectly.

Figure 3:
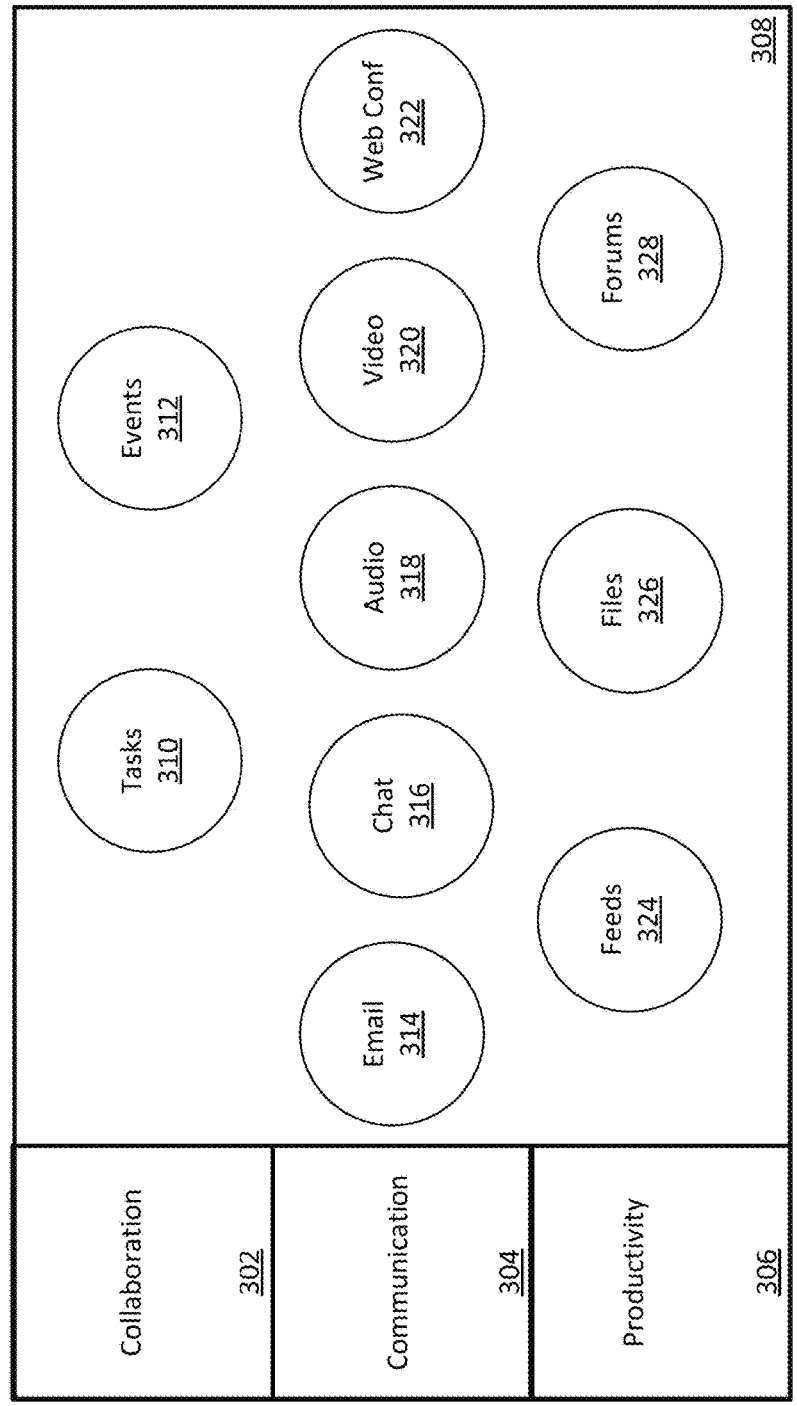
FIG. 3 is a diagram of examples of software applications of a unified software suite.

FIG. 3 is a diagram 300 of examples of software applications of a unified software suite. Several software applications could be deployed to realize the connection among entities of the unified software suite. These software applications broadly fall under three different contexts—collaboration 302, communication 304, and productivity 306. Examples of software applications with communication context include email 314, chat 316, audio 318 (e.g., voice calls, audio recordings, meetings, and music, to name three examples), video 320 (e.g., video calls, video recordings, and graphical animations, to name three examples), web conference 322 (or, more generally, a meeting scheduled via a calendar application or for which the unified software suite has otherwise been notified, with or without a transcript, recording, or video recording of the meeting), etc. Examples of software applications with collaboration context include tasks 310, events 312, and workdrive-related applications, such as Customer Relationship Management (CRM), finance-books, projects, calendar, etc. Examples of software applications with productivity context includes feeds 324, files 326, and forums 328.

Software applications with communication context enable connection between or integration among entities through conversation, mail, chat, web meetings, etc. Communication is among one or more entities like "employees", "customers", "prospects", "suppliers", "partners" and "candidates". The communication among the entities is about one or more entities like "time", "material", "products", "service", and "finance". For instance, a communication between an "employee" entity and a "supplier" entity could be a conversation related to delayed payments to a "supplier". The conversation should include "finance" details in context. This uniquely enables bringing context to almost every conversation. Advantageously, understanding inter-connections can facilitate pre-enabling connections.

Figure 4:
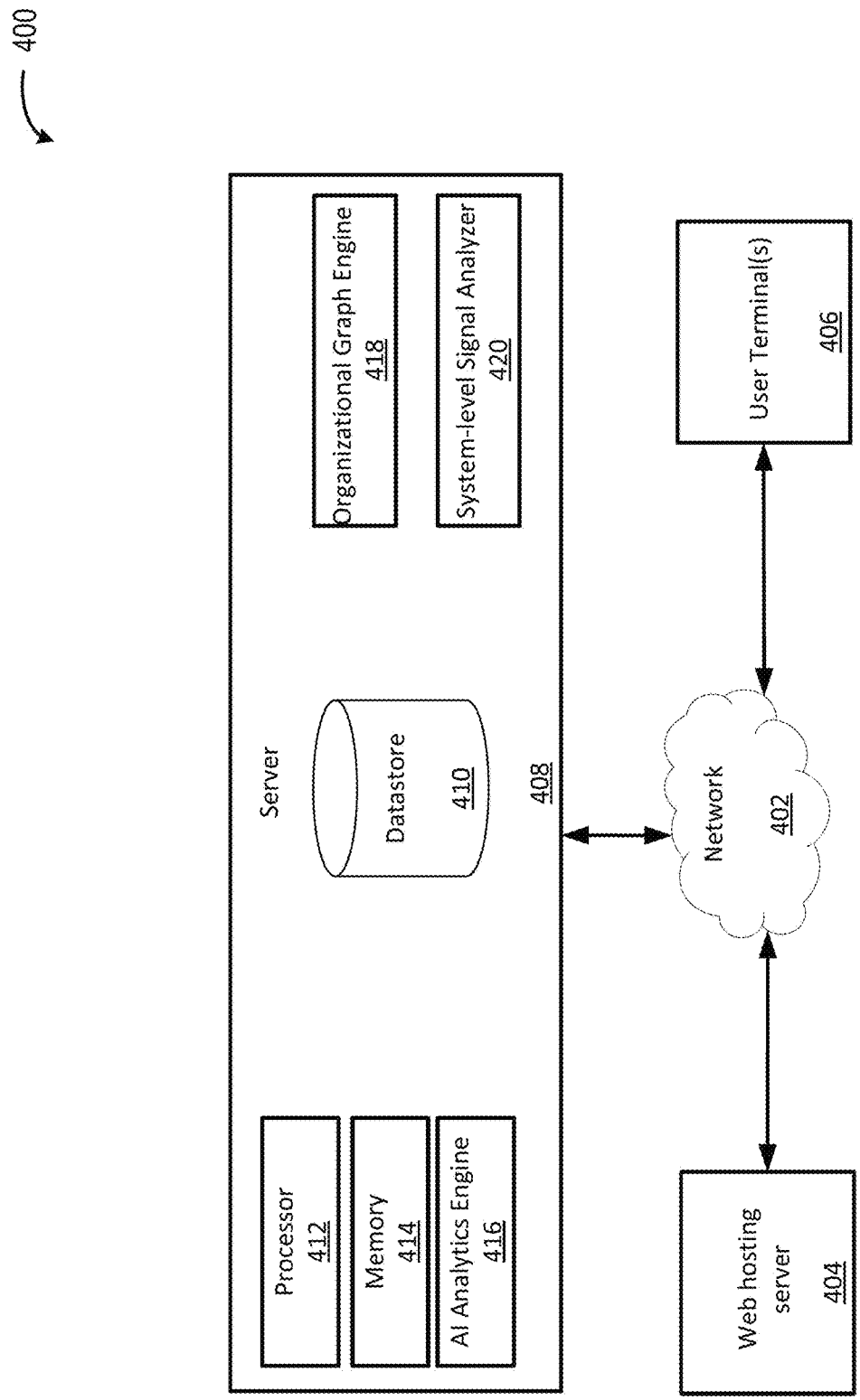
FIG. 4 is a block diagram of an example of an entity card utilization system.

FIG. 4 is a block diagram 400 of an example of an entity card utilization system. In this example, the system comprises an application server 408 connected to one or more user terminals 406 through the network 402 (e.g., the Internet) and a web hosting server 404 to host a unified software suite on the Internet.

The application server includes an Artificial Intelligence (AI) analytics engine 416, system-level signal analyzer 420, organizational graph engine 418, a processor 412, memory 414, and a datastore 410.

The system-level signal analyzer observes and collects signals (e.g. notifications like message, mail, payment, etc.) across the unified software suite, and stores them in the datastore.

Entities and connections between them are stored in the form of nodes and relationships respectively in an organizational graph in an organizational graph datastore. The organizational graph datastore is present in the data storage and, in this example, is flexible, dynamic, and easy to integrate into the unified software suite.

In a specific implementation, an organizational graph is created including a set of nodes that are connected or related to each other. Each node in the organizational graph represents an entity (e.g., a record or a data item belonging to an entity). Each node comprises a label or a tag to define the role of the entity in the organization. A relationship between two nodes refers to a connection (through software applications of any context namely communication, collaboration or productivity) between the two entities. Each relationship has a direction and name and is connected to two nodes. Each node can have a relationship type and a set of relationships with another node. In a specific implementation, relationships are always directed, but they can be navigated efficiently in any direction.

When an entity connects with one or more entities through a software application in any context, the same is captured by the organizational graph. The organizational graph engine receives navigation context or user query. It navigates through the organizational graph to search for the required data corresponding to the navigation context or user query. It retrieves the required records or data items belonging to one or more entities along with the relationship between them, from the organizational graph. In a specific implementation, these records are displayed to a human agent of an entity, who can be referred to as a "user."

The AI analytics engine hooks to the data in the data storage and provides valuable insights in the form of trend graphs, score values, etc. The AI analytic engine provides live insights into the data.

The network 402 is intended to represent a network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. As used in this paper, a means for computing, initiating, or stopping (in a computer system context) includes a processor of some kind, and is intended to include a hardware processor executing instructions, if applicable.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, erasable programmable read-only memory (EPROM), or electrically erasable programmable read only memory (EEPROM), a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer system location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer system location." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an integrated services digital network (ISDN) modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system. As used in this paper, a means for sending, requesting, providing, or receiving includes an interface of some kind (potentially including a user interface).

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. For example, with reference to FIG. 5, the contextual module can be implemented as a contextualization engine, the access control module can be implemented as an access control engine, and the logic module can be implemented as a logic engine; the UI layer and data layer can also include engines, such as a UI processing engine, a customization engine, a UI level ID generation engine, a design element creation engine, or a data access engine (or the engines of the process layer can utilize datastores therefrom). As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer system for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

The network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

A LAN is a private network that connects devices within a limited area like a residence, an office, a building or a campus. A wired LAN uses Ethernet cables to connect computers together directly or more commonly, through a hub, switch, or router. Wireless networks use radio waves to connect devices such as laptops to the Internet and other hand held devices.

FIG. 5 is a diagram 500 functional layers and components of an example of a unified software suite. A 3-tier client-server architecture is used by way of example to build the unified software suite. In this example, there are three logical layers, a User Interface (UI) layer 502, a process layer 504, and a data layer 506. The data layer handles and stores data (if required), the process layer handles logic, and the UI layer controls a Graphical UI (GUI) that can be used to communicate with the other two layers. To offer unified experience, the connectivity or integration among entities should be reflected in all three layers.

Data items of the attributes in the entities are displayed on UI with a basic design element called a "card". There are several other types of design elements like list, popover, side-bar, etc. that can be used to display the data items. Popover can be actionable in scenarios in which, for example, they include provisions with a set of graphical elements, e.g., action buttons, to complete a task. Hence, the user can experience a uniform design and has no need to switch between the tabs of different software applications with different user interfaces. One or more data items are mapped to a corresponding design element that is itself mapped to a UI display mode based on the context and permission level determined by the contextualization engine and access control engine. Hence every data item has several different identities (IDs) in each functional layer of the unified software suite. Table 1 lists various IDs that are used in a specific implementation to display a data item from the data layer onto the UI layer to provide a seamless visual experience to the user.

TABLE 1

IDs for a data item in data layer and the UI layer

| Name | Description |
| --- | --- |
| UI level ID | The unique ID of the mode of the design element as viewed by the user. The examples of several modes of the design element say card refers to the height of the card, width of the card, etc. |
| Design level ID | The unique ID of the design element like card, list, popover, etc. Each design element has its ID created in the UI layer. Examples of design level ID include card ID, list ID, etc. |
| Data level ID | The unique ID of the data items of the attributes of every entity. It is generated when the data item is created for the first time. Even the information regarding the relationship between the attributes are also considered to be an entity. Thus they could also have a unique data level ID. |

There are several components which collectively represent the three layers of the unified software suite. Some of these components may exist on the user terminal, some on the server, or some combination thereof.

The data access platform 526 of the data layer 506 is an abstraction layer encapsulating the data access components 524 and functionality.

The data access component integrates access to different data sources. This component also coordinates data manipulation. In a specific implementation, in the event a storage offering shall be replaced or the interface of a storage offering changes, the data access component is the only component that has to be adjusted.

The logic module 522 of the process layer 504, which can be implemented as a logic engine, accepts user requests, processes them, and determines the routes through which the data will be accessed.

The access control module 520 of the process layer 504, which can be implemented as an access control engine, determines access permissions of users. In a specific implementation, the engine determines a data item or record a user can create, read, update, and/or delete (CRUD). The access permission depends on the following factors:

i) Hierarchy level of the user in the organization;

ii) Time zone or location of the user; and/or iii) Privacy related Permissions: An entity can choose who can access the personal information provided by them to the organization.

The contextual module 518 of the process layer 504, which can be implemented as a contextualization engine, determines the origin of a user or finds an answer to the question "Where is the user from?" and builds context dynamically. In a specific implementation, the contextualization engine builds context which is a compound aggregate of the following sub-contexts:

i) Time zone or geographical location context of the user: Determining the current location of the user to analyze the place or time zone, from where the user is requesting access. For example, Consider two users user 1 and user 2 from different time zones. Then the cards could be displayed in day mode or night mode, based on the time zone of the user. Similarly, time zone plays a crucial role in representing dates (DD/MM/YYYY, YYYY/MM/DD), time format (12 hours, 24 hours) etc.

ii) Navigation pattern of the user: Determining the context of the activity cards based on the navigation pattern of the user. As an example, consider a user viewing interactions of a company entity "Zenn Inc." The user can navigate to the activity screen of an employee entity from the activity screen of the company entity Zenn Inc. A list of activity cards related to the selected employee entity will now be displayed to the user. This difference is due to the change in the navigation context. The navigation could also be from an entity for example an application used for communication purposes. Assume a scenario when a user is communicating or chatting with a customer using a software application for communication. Now the communication itself becomes a context to the customer and the customer becomes a context to the communication.

iii) Personalized or preferential context: Determining the customizations required by user according to his/her personal preferences (due to age factor, a disability like color blindness, etc.) like font size, color themes, etc. For a user with a disability like color blindness, the UI level ID of the cards will be different when compared to the UI level ID of the cards displayed for a normal user without any disability.

iv) Privacy related context: Accessing details of each entity based on a static permission set by the entity itself. The static permissions set by the entity are stored in a data storage. For example an entity say employee can decide on what personal information he/she can provide to the organization. If the organization entity does not have a static permission and still tries to access the personal information of the employee, then the employee is immediately notified about this to seek his/her permission in real time. Usually data protection regulations like GDPR mandate these kind of privacy preservation policies for customers. The proposed unified software suite not only offers such benefits to customer entity alone. It is possible to preserve the privacy of any persona-based entities like employees, contacts, etc.

Based on access permission and context determined by the access control engine and contextualization engine, data items to be mapped to design elements are filtered from the organizational graph. The design elements are mapped to the corresponding UI level ID as determined by the contextualization engine and access control engine. The UI level ID generator 514 of the UI layer 502 generates the UI level IDs and the design element creator 516 of the UI layer 502 creates design element instances.

The UI components 510 of the UI layer 502 are various design elements present on the UI. Because users have often become familiar with the way these design elements work, consistent and predictable choices become desirable, which leads to smooth task completion, efficiency, and satisfaction of the users. User interactions on the UI are synchronized and organized by the UI process components 508, when implemented as UI process component engines. This enables the same basic user interaction patterns to be reused by multiple user interfaces. The customization module 512, when implemented as a customization engine, customizes the visual appearance of the design elements by user request.

Design elements include cards, lists, popovers, side bars, input controls, informational components, navigational components, containers, etc.

Design element creator aids in the process of creating the design elements like cards, lists, pop over, etc. In a specific implementation, there exists a separate module for creating each type of design element. For instance, a card creator is involved in creating cards, a list creator is involved in creating lists, and a pop over creator is involved in creating pop overs. Similarly, other such creators are involved in creating other types of design elements.

Figure 6:
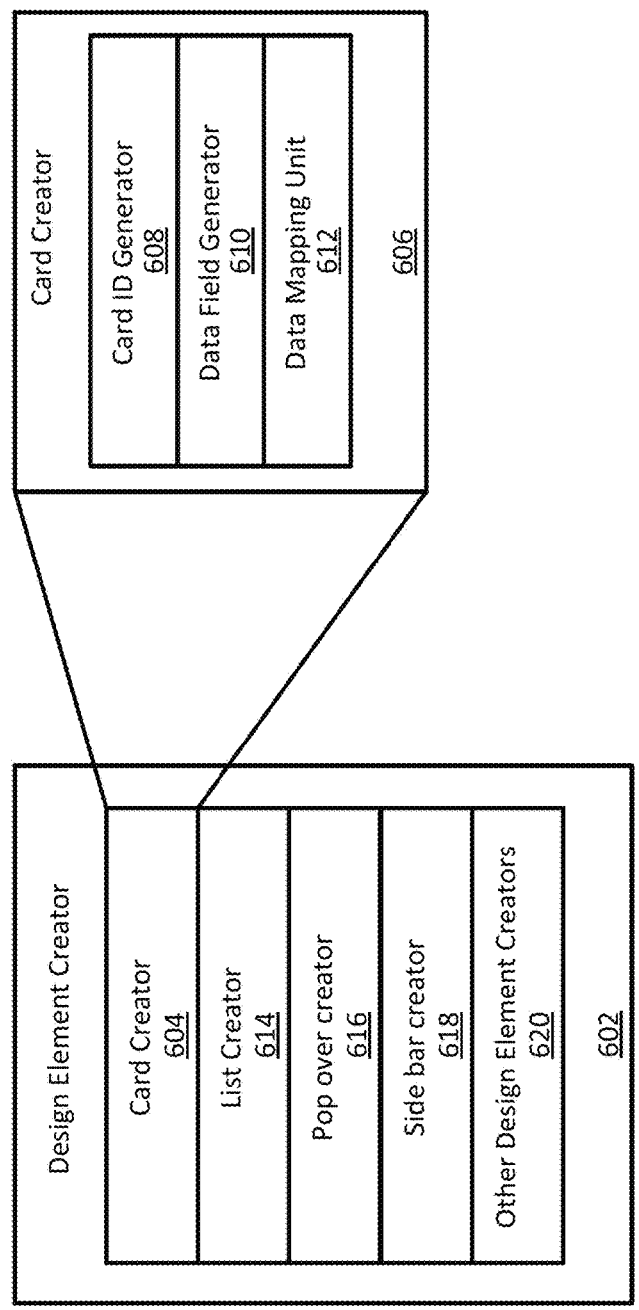
FIG. 6 is a diagram of an example of a design element creator.

FIG. 6 is a diagram 600 an example of a design element creator. In the diagram 600, a design element creator 602 includes a card creator 604, a list creator 614, a popover creator 616, a sidebar creator 618, and other design element creators 620. The card creator 604 of the design element creator 602 creates and customizes card designs. A "card" is an UI design pattern that groups related information or data items of one or more entities in a flexible-size container that, at least in a specific implementation, visually resembles a playing card, hence the name. Despite its origin, the term "card" is intended to include modular shapes that do not resemble playing cards. The card is used to create modular UI patterns as it works well across a variety of screens and window sizes. In a specific implementation, cards have the following properties: Cards are used for grouping information; cards present a summary and link to additional details; and cards allow for flexible layouts.

In the example of FIG. 6, the card creator 604 is blown up for more detail as card creator 606. The card creator 606 includes a card ID generator 608, a data field generator 610, and a data mapping unit 612. The card ID generator generates a unique ID for every card, called Card ID which is actually a type of design level ID. In a specific implementation, the data field generator is a drag and drop interface enabling users/designers to drag and drop database fields (or custom computed fields) on to the card design to represent the data item. On top of dragging a field to a card, the data mapping unit maps data level ID of required data items from the data storage to corresponding database fields. The mapping process associates the data items and cards based on context (as determined by the contextualization engine) and access permissions (as determined by the access control engine). Database fields are just one type of element represented on a card. Other elements could be text, tags, images, etc. Data represented on a card can come from custom applications or third-party applications/sources.

Each card can have multiple display designs or visual patterns (modes, size, filter, etc.). The UI level ID generator generates UI level ID for each design of the card. A single card ID can be mapped with multiple UI level IDs. A card can be displayed in different UI designs and even with different contents. The visual pattern can differ in each case. Every visual pattern has a unique UI level ID. This means that a single card ID can be mapped to multiple UI level IDs.

UI level ID is picked based on the context and access permission determined by the contextualization engine and access control engine. It can also be customized based on user requirements.

Figure 7:
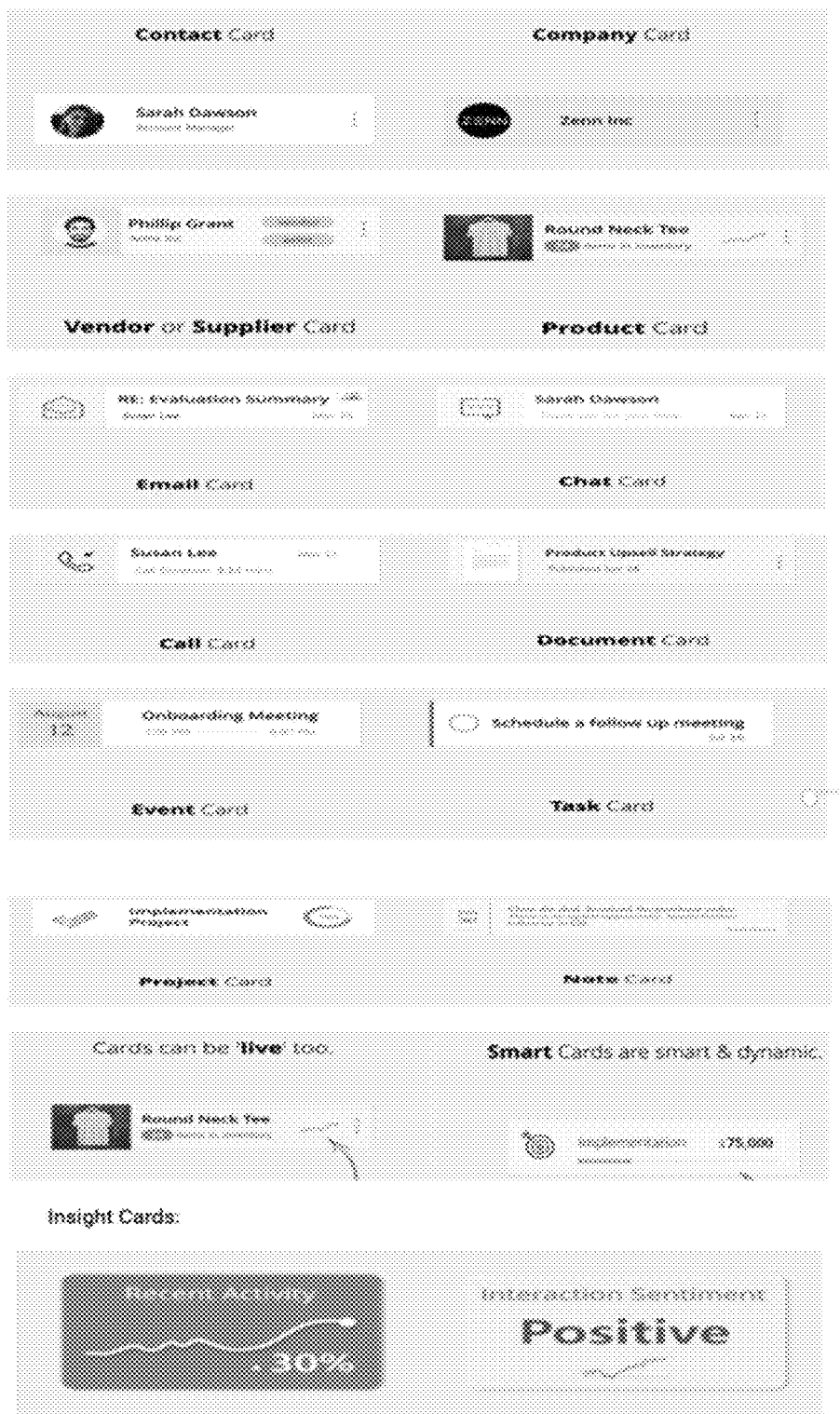
FIG. 7 includes screenshots of examples of different types of cards.

FIG. 7 includes screenshots 700 examples of different types of cards. Based on the relationship of the entities, cards can be broadly classified into three categories, collaboration card, communication card or interaction card, and productivity card. Collaboration card is further classified into task card, event card, activity card, etc. Communication card or interaction card is further classified into email card, chat card, audio call card, video call card, meeting card, etc. Productivity card is further classified into feed card, file card, forum card, etc. Based on the type of entity, the cards can also be classified into contact cards (contact card of an employee, company, customer, supplier, vendor, etc.), product card, etc. The cards can be smart cards, live insight cards, and snapshot cards. The contents of these cards are highly dynamic corresponding to the trend analytics of the data items mapped to it.

Figure 8:
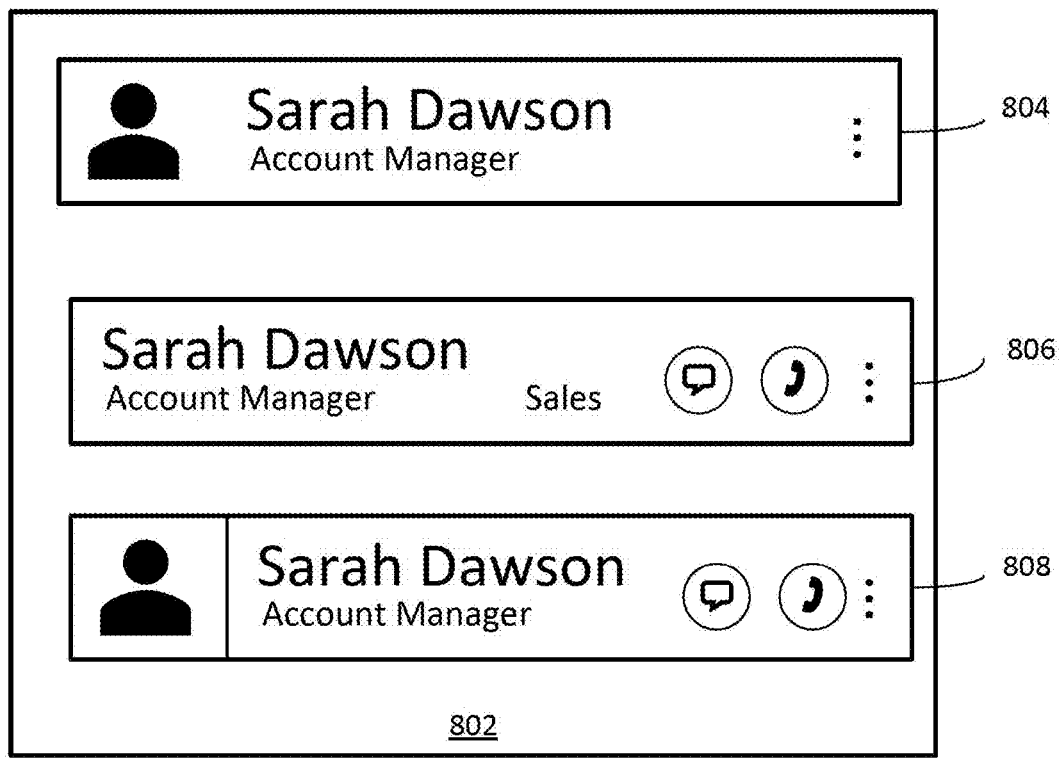
FIG. 8 includes conceptual illustrations of multiple designs of a card for an "employee" entity.
Figure 9:
FIG. 9 is a diagram of day mode and night mode variations of a card for an "employee" entity.
Figure 10:
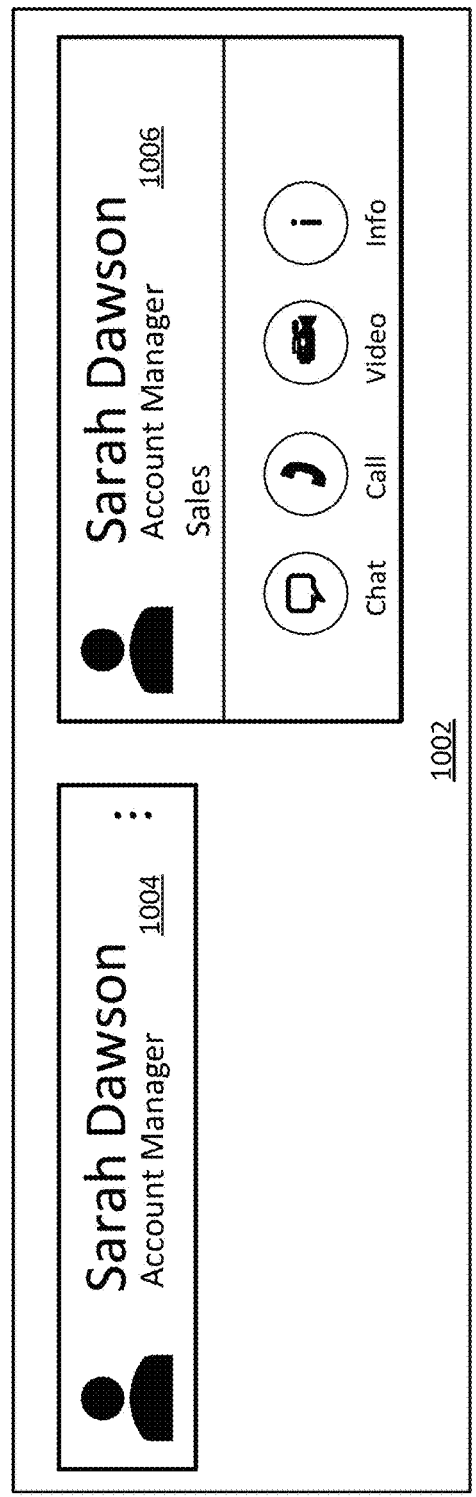
FIG. 10 is a conceptual diagram of a card of an "employee" entity with different heights (single and double).

FIG. 8 includes conceptual illustrations 802 of multiple designs 804, 806, 808, of a card for an "employee" entity. A card can be displayed in different modes i.e. day mode and night mode. FIG. 9 is a diagram 900 of day mode and night mode variations of a card for an "employee" entity. A card can also be displayed in different heights i.e. single height and double height. FIG. 10 is a conceptual diagram 1000 of a card of an "employee" entity with different heights (single and double).

An entity details screen displays a selected entity when a user clicks on one of the entity cards from, e.g., an entity list. If each card takes the user to a respective software application that owns the data, they will be treated with a different user experience for each entity. Advantageously, software applications can be pushed behind to focus on the entities and offer a consistent UI for every entity to provide a uniform experience.

Figure 11:
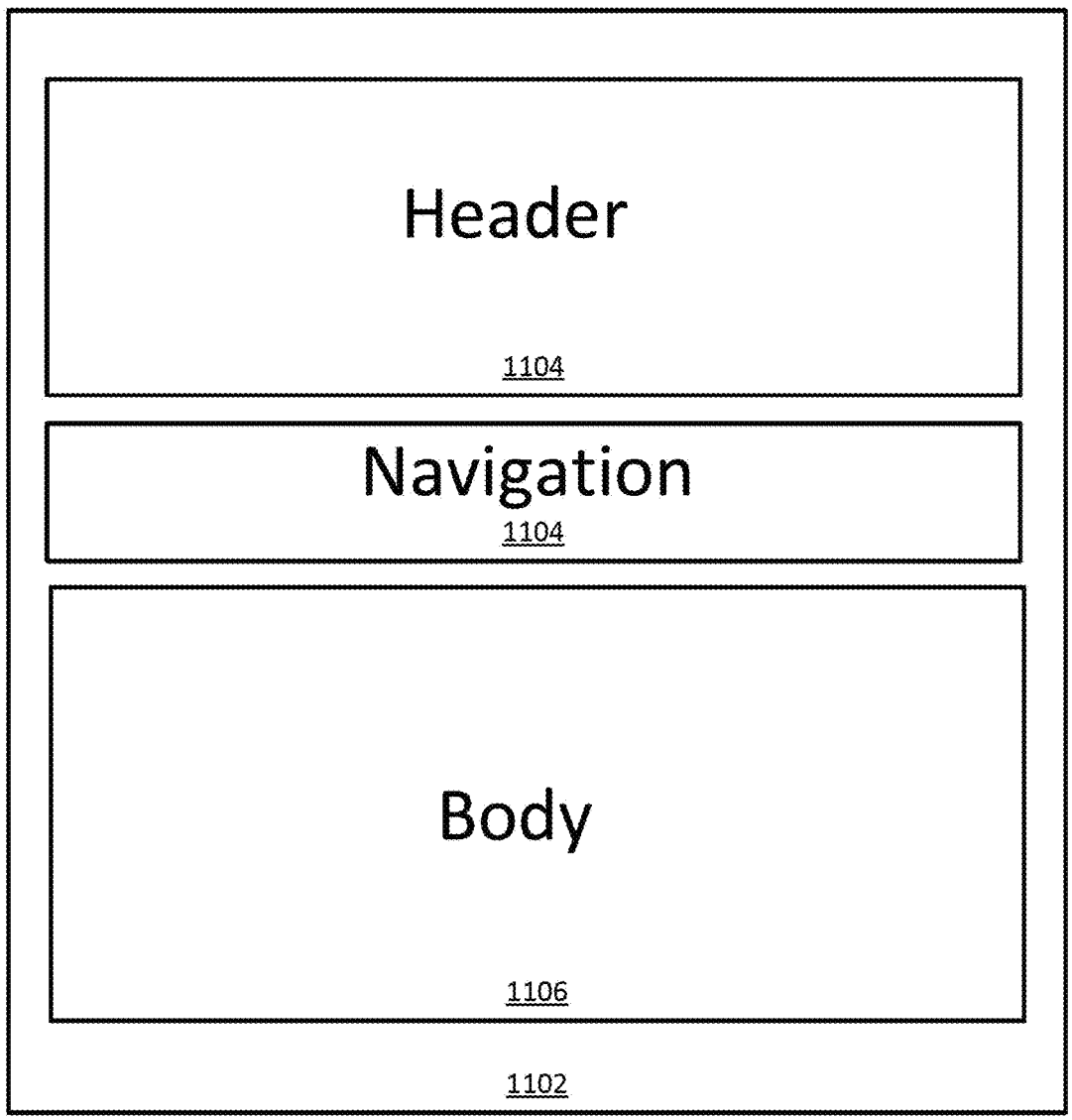
FIG. 11 is a block diagram of a layout of an example of an entity details screen.

FIG. 11 is a block diagram 1100 of a layout of an example of an entity details screen. The entity details screen for each entity is different and can be dependent on relationships, context, and access rights/permissions of the user. In this example, an entity details screen 1102 is split into header 1104, navigation bar 1106, and body 1108.

The header of the entity details screen indicates common information about the entity which is accessible by all. It includes entity logo and address, tags, snapshot cards, and live insight cards. A couple of entities, "customers" and "employees", have been picked to illustrate entity details. For this example, customers will have two sub-entities in the Business-to-Business (B2B) context, namely "company" and "contact(s)." The entity details screens for Company, Contact & Employees have been used to illustrate the concept.

Figure 12:
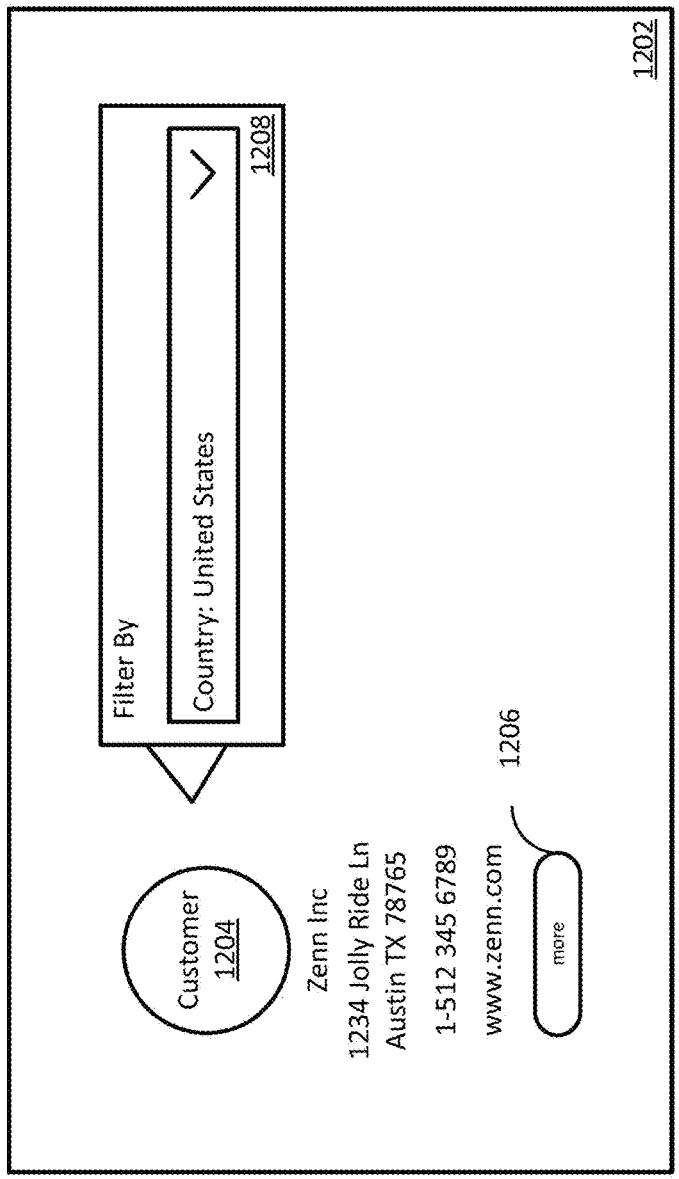
FIG. 12 is a diagram of an example of an actionable popover.

FIG. 12 is a diagram 1200 of an example of an actionable popover. The header 1202 ignores details that could be provided in the header of an entity details screen for illustrative purposes. An entity logo 1204, which is a customizable text or a graphic associated an actual entity, is displayed in the header 1202. The entity logo 1204 is displayed along with related text, such as an address, and a "more" button 1206, which could be selected to provide additional detail, cause navigation to an entity details screen, or the like. An address typically includes company name, location, contact address, and web site information. The logo and address vary for each entity. As an example scenario, the logo varies for entities such as a customer, a prospect, a vendor, and a partner wherein for a customer entity, the respective customer company logo is displayed.

In the example of FIG. 12, when a menu located near the entity logo is hovered over an actionable popover 1208 is displayed. The actionable popover shows a "Filter By" option with a dropdown box containing a "Country" list. In this example, "Country: United States" is shown. When a selection from the "Country" list is made, context in the entity screen is refreshed to display cards of customers, activities, and resources based on the selected country, which can include cards of persona-based entities, e.g. customers; activities for e.g. meeting schedules or collaborative projects; and resources for e.g. documents shared/working on/notes appropriate for the selection.

Tags are quick access to specific categories of content to support navigation. The header of the entity details screen includes one or more of manual tags or user tags; AI tags, automated tags, or dynamic tags; system level tags; or organization tags. A set of skills possessed by each entity is displayed as manual (or user) tags; manual tags provide instantaneous access to but not limited to customer case study, referral customers, customer contracts, etc.

AI (or automated or dynamic) tags automatically create detailed tags of entity metadata wherein the AI tags when hovered display additional details in a popover. AI tags are generated by an analytics engine. As an example scenario, when a high cost lead AI tag is hovered over, a popover with information regarding revenue details of the respective entity is displayed. In a specific implementation, the popover is actionable in at least some AI tags.

Figure 13:
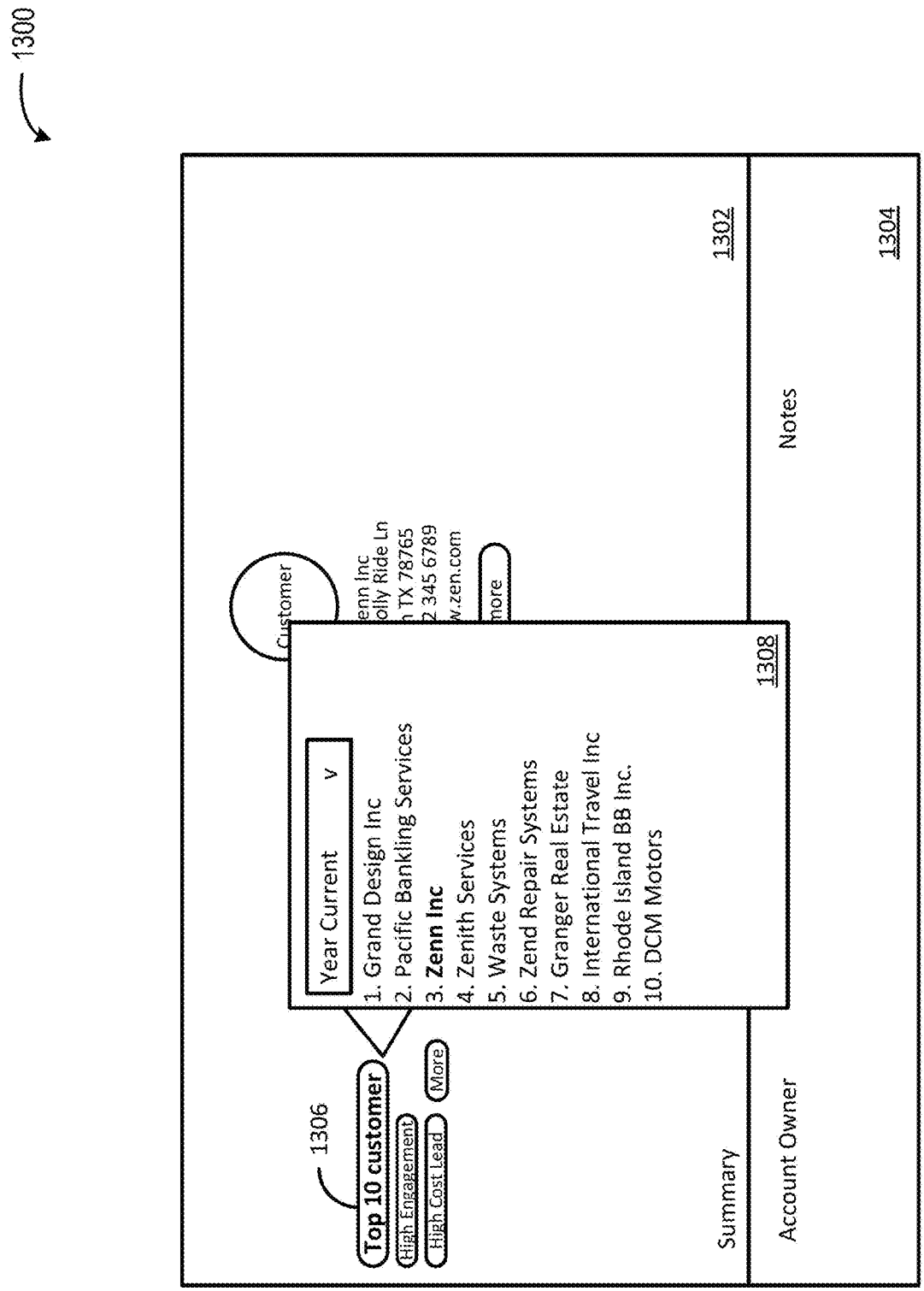
FIG. 13 is a diagram an example of an actionable popover for "Top 10 Customer."
Figure 14:
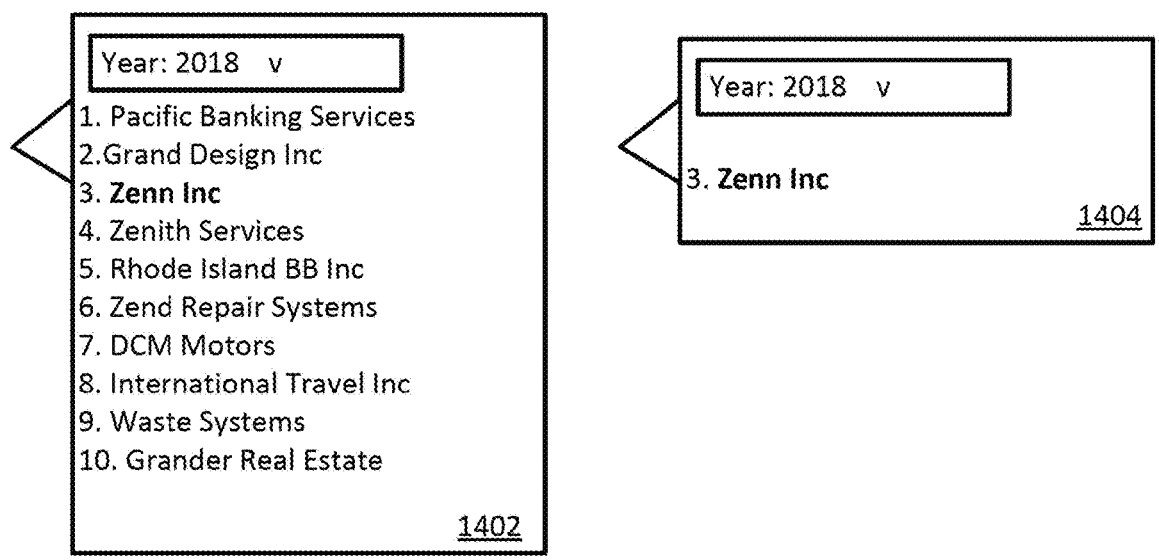
FIG. 14 depicts examples of an actionable popover when year "2018" is selected.

FIG. 13 is a diagram 1300 an example of an actionable popover for "Top 10 Customer." The header 1302 ignores details that could be provided in the header of an entity details screen for illustrative purposes. (A portion of the body 1304 is also shown, to illustrate the popover can cover a portion of the screen other than the portion in which an input action is taken to trigger the popover.) When the Top 10 Customer AI tag 1306 is hovered over, an actionable popover 1308 is shown with information about the Top 10 Customers with a selectable dropdown box containing years. FIG. 14 depicts examples of an actionable popover when year "2018" is selected. When a particular year is selected, for example "2018", the Top 10 Customers in the year "2018" is listed in the popover 1402. When an entity for a particular year, for example "2018" is selected, the entity's rank in the year "2018" is shown in the popover 1404.

AI tag is dynamically applied based on aspects that may not have anything to do with a particular entity directly. As an example, when Deal A is won, customers related to Deal A might be in the Top 25 customer list. When Deal B is won, the Top 25 customer list will change to customers related to Deal B, hence its dynamic. AI tags can be applied to any entity.

Figure 15:
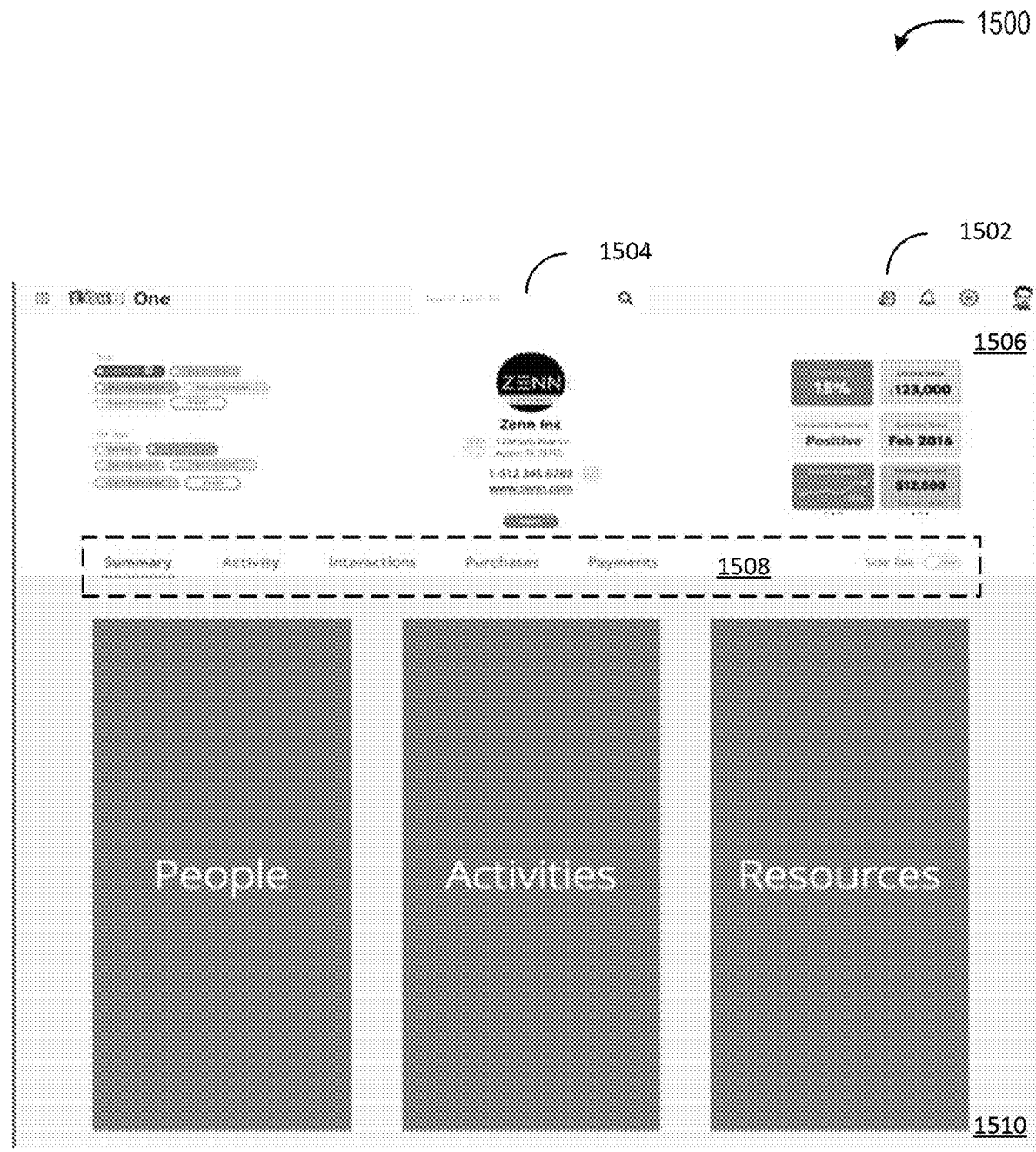
FIG. 15 is a modified screenshot of a "company" sub-entity in an entity details screen.

FIG. 15 is a modified screenshot 1500 of a "company" sub-entity in an entity details screen. AI search space 1504 is present on the top of the entity details screen 1502, and is contextual to every entity. The search space 1504 is pre-trained for all entities wherein entity search contextually appears on respective entity details screens. In the example of FIG. 15 (and FIG. 11), the search space on the top is contextual for a "company" entity. For instance, for a data item or record named "Zenn Inc" of the company entity, the AI search space can include a set of pre-trained queries such as:

Show me interactions from Zenn this year.
Bring up recent payment activity from Zenn.
Show the documents shared with Zenn, group by contact.

Get me signed documents from Zenn.
Show recent website activity from Zenn.
Show recent news from Zenn.

The header 1506 of the entity details screen includes snapshot cards and live insight cards to hold short and related pieces of information summary about an entity. Snapshot cards are a snapshot-like display of high and critical information about an entity. As an example scenario, for a customer entity, snapshot card displays a lifetime value of the customer and pending payments. This can include but is not limited to text, images, and graphics.

Live insight cards display up-to-date and live infographics about an entity wherein infographics refers to graphic visual representation of data or information. As an example scenario, for a customer entity, live insight card displays infographics of customer progress.

The background colors within the snapshot cards and live insight cards differ from the background color of the underlying canvas. The background colors are dynamic as they represent potential prospects of an entity. The contents in header vary for each entity based on the context and access permissions determined by the contextualization engine and access control engine. On mouse-over a specific tag, the tag expands to a pop-over to display more details.

The navigation bar 1508 of the entity details screen is an interface element that drives a user through entities based on connections. The tabs in the navigation bar can vary for each entity based on the context and access permissions determined by the contextualization engine and access control engine. The tabs in the navigation bar of the entities "Employee", "Contact" and "Company" are thus different from each other. This is due to the changes in context and the access rights/permissions determined by the contextualization engine and access control engine.

In a specific implementation, the navigation bar 1508 also displays an option to launch side talk. Side talk is a provision to talk about an entity. During communication, a side talk can be on a document entity. In another scenario a side talk can be on a sales lead entity among the members of a sales team to close the lead. In another example, say during an interview process, a side talk can be on a candidate entity. In this example, when multiple candidates show up for an interview, the hiring manager and HR personnel can have a side talk on each candidate's performance then and there. Communication aspects are interlinked with the core entity itself.

The body area 1510 of the entity details screen displays highlights of activities involving an entity that have been selected by a user, corresponding to the connections to other entities of an organizational graph. Hence the information on the body area 1510 reflect or represents the connectivity of the entity (selected by user) with other entities of the organizational graph. But the entity details screen of one entity differs from the entity details screen of another entity due to the changes in context and the access rights/permissions determined by the contextualization engine and access control engine.

For example, assume that "Company" entity is selected by a user to view its details, then a "Company" entity's relationships with other entities like "Employees", "Finance", "Product", "Service", "Partner" and "Prospect" are displayed in the body area 1510. These data items are mapped into cards. Cards with a similar context are grouped into lists. These lists are ordered based on their context. The lists matching to persona-based context appear on the left-most column; activity-based context appear in the middle column; and resource-based context appear on the right-most column of the body area 1510. There are other custom layouts that could be picked or defined by an Administrator.

Figure 16:
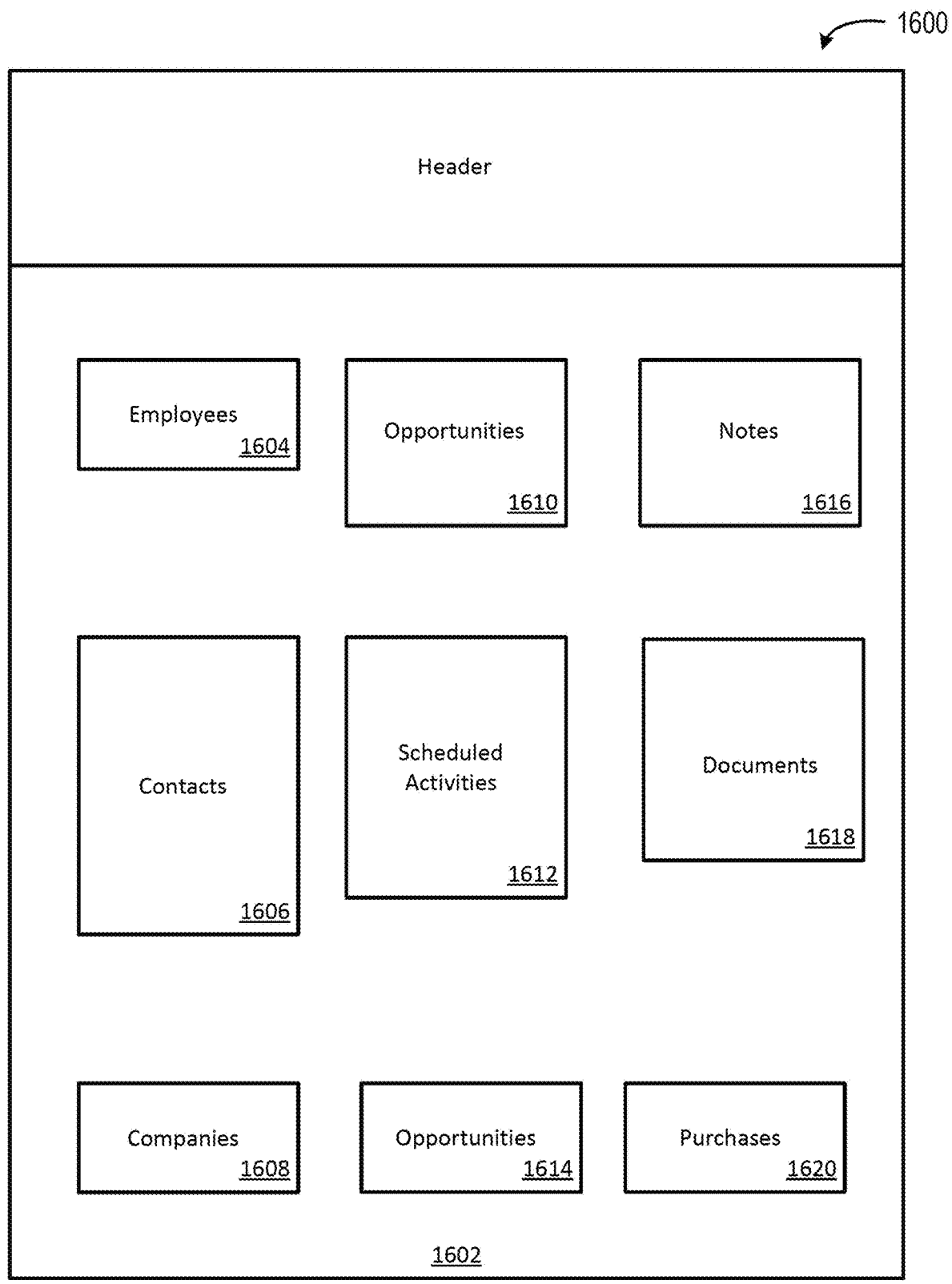
FIG. 16 is a diagram of an example of a "company" sub-entity in an entity details screen.

FIG. 16 is a diagram 1600 of an example of a "company" sub-entity in an entity details screen. On the entity details screen of Company, the left-most column of the body 1602 includes persona-based entities to which the "company" entity is connected. It includes a list of associated employees 1604 such as account owners; a list of associated contacts 1606; and a list of similar companies 1608.

The middle column includes activity-based entities to which the "company" entity is connected. It includes a list of available opportunities 1612 (e.g., pulled from CRM software applications); a list of scheduled activities 1614 including Open Activities & Events (e.g., pulled from software applications like CRM/Calendar/Meeting); and a list of opportunities 1616 associated with active/ongoing projects (e.g., pulled from software applications for managing Projects).

The right-most column includes resource-based entities to which the "company" entity is connected. It includes a list of notes 1616 for the account (e.g., pulled from CRM and finance-book software applications); a list of shared documents 1618 (e.g., pulled from software applications like WorkDrive, mail attachments, etc.); and list of purchases 1620 of products and/or services by the "company" entity (e.g., pulled from CRM software applications). In this example, as there are no connections on services and partners for "company" entity, those cards were not displayed in the entity screen. If there are any connections on services and partners for "company" entity, then those cards can also be pulled up and displayed in the entity screen.

Clicking on a card on the entity details screen, takes the user to the entity details screen of the respective card. The contents displayed on the entity details screen of a particular entity are different from the contents displayed on the entity details screen of another entity. At the same time, the visual pattern of the contents also varies while displaying the contents on the entity details screen for each entity. This is because of the change in context and access permission determined by the contextualization engine and access control engine.

Figure 17:
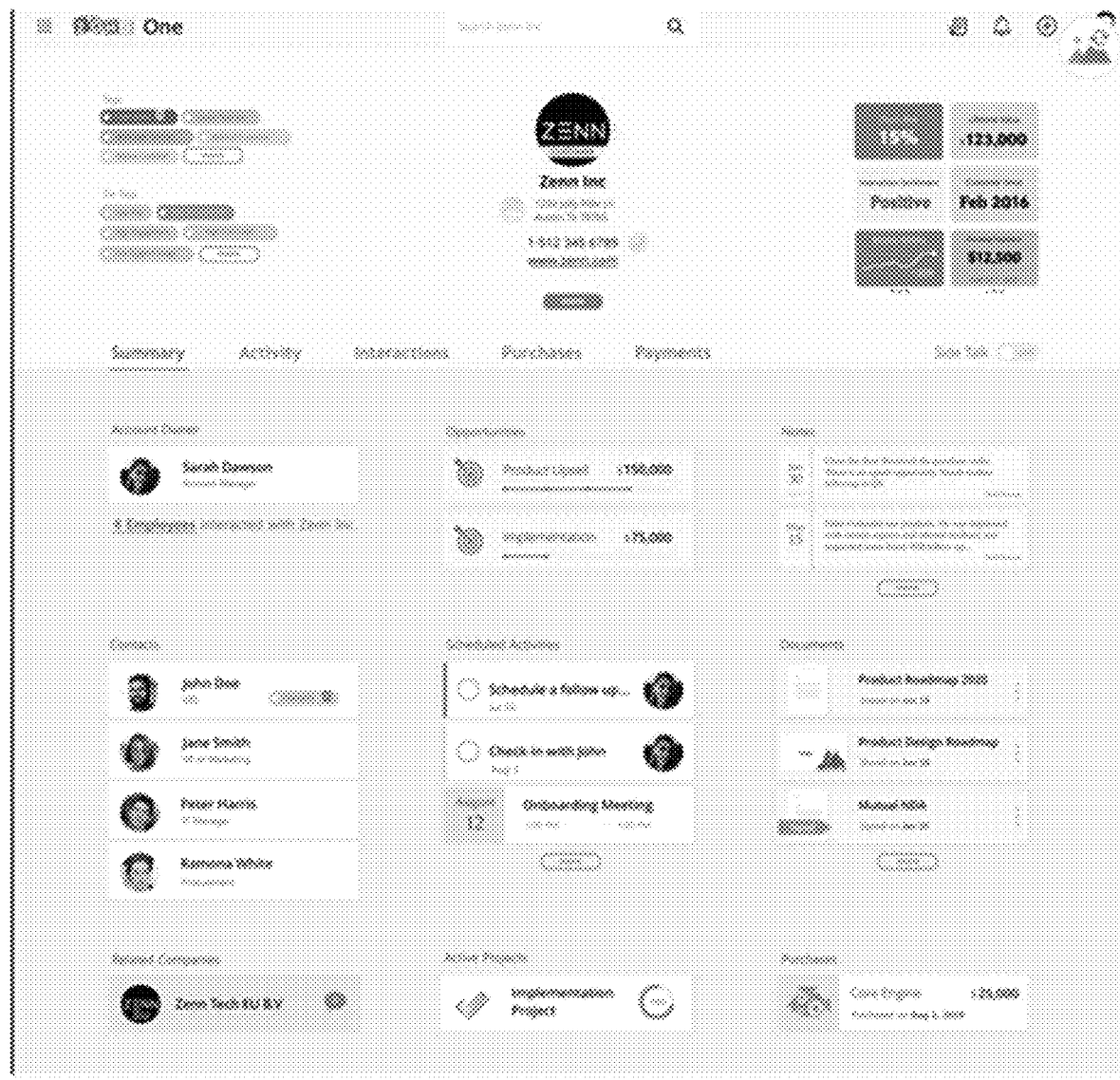
FIG. 17 is a screenshot of an example of an "employee" entity in an entity details screen.

FIG. 17 is a screenshot 1700 of an example of an "employee" entity in an entity details screen. For example, if a user clicks or selects a card from the account owner list on the company details screen, then the Employee details screen is displayed with a context i.e. sales, marketing, etc. Though the basic skeleton of the contents in the body area of the entity details screens of "employee" and "company" are the same, the summary differs. This is due to the connection of the entity with other entities and also due to change in context and access permission as determined by the contextualization engine and access control engine.

On the "employee" entity details screen, the left-most column includes persona-based entities to which the "employee" entity is connected; it includes a list of senior officials or reporting managers, team members and subordinate employees. The middle column includes activity-based entities to which the "employee" entity is connected; it includes a list of internal activities like forum posts, forum comments, etc. performed by the "employee" entity. The right-most column includes resource-based entities to which the "Employee" entity is connected; it includes a list of documents published by the "Employee" entity. Apart from this, a set of skills possessed by the "Employee" entity is displayed as manual tags.

Figure 18:
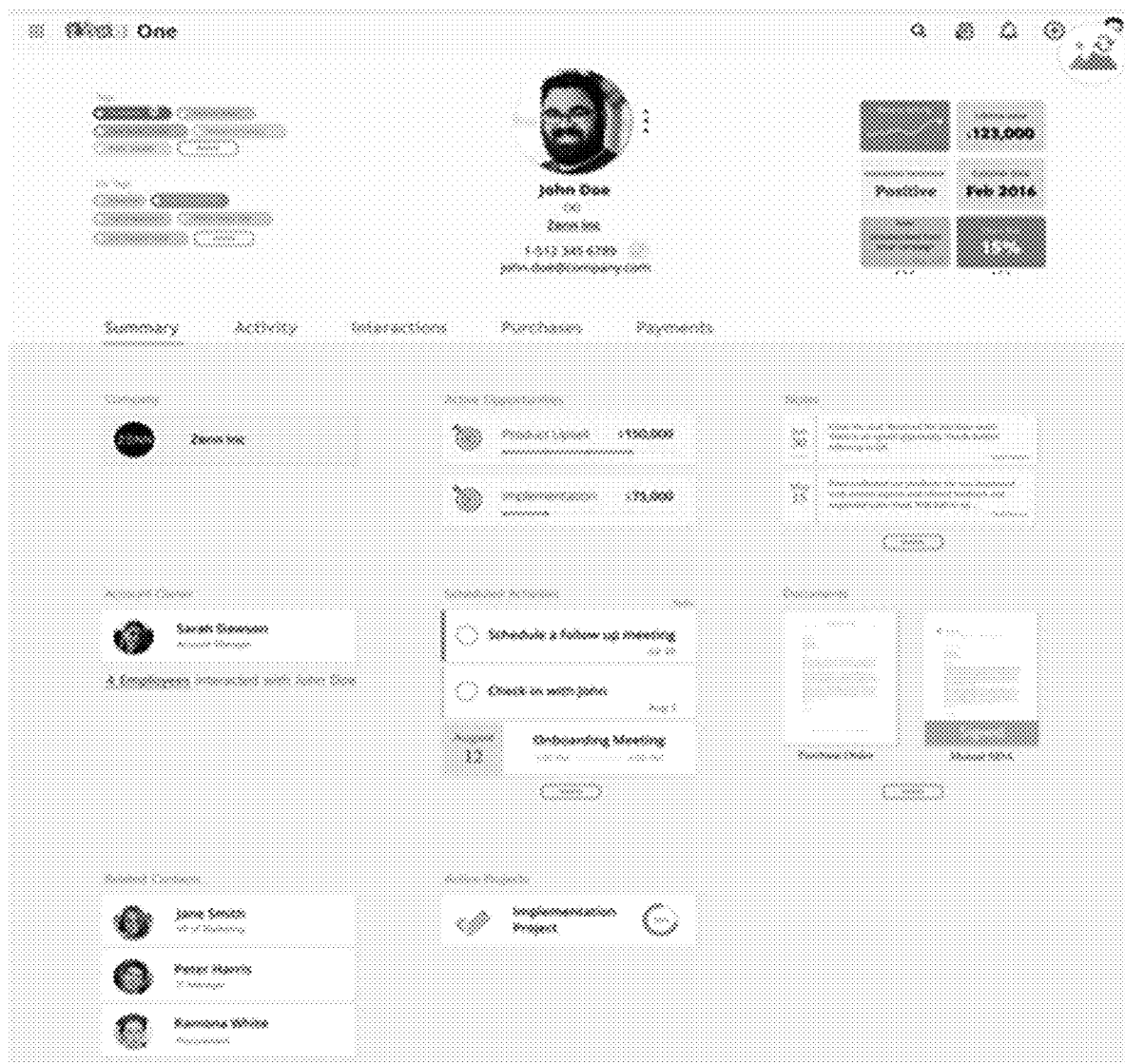
FIG. 18 is a screenshot of an example of a "contacts" sub-entity in an entity details screen.

FIG. 18 is a screenshot 1800 of an example of a "contacts" sub-entity in an entity details screen. If a user clicks or selects a card from the contact list on the "company" details screen, then the "contact" entity details screen is displayed with a corresponding context e.g., sales, marketing, etc. Though the skeleton of the contents in the body area of the entity details screens of "contact" and "company" are similar, the summarization differs. This is due to the connection of the entity with other entities and also due to changes in context and access permissions.

On the "contact" entity details screen, the left-most column includes persona-based entities to which the "contact" entity is connected. It includes the details of the "company" entity of the "contact" entity; a list of associated employees such as account owners; and a list of other contacts (e.g., related to the "company" entity and selected "contact" entities).

The middle column includes activity-based entities to which the "contact" entity is connected. It includes a list of available opportunities (e.g., pulled from CRM software applications); a list of scheduled activities including open activities & events (e.g., pulled from software application e.g. CRM/Calendar/Meeting); and a list of active/ongoing projects (e.g., pulled from software application for managing projects).

The right-most column includes resource-based entities to which the "contact" entity is connected. It includes a list of notes for the account (e.g., pulled from CRM software application); and a list of documents (e.g., pulled from software applications e.g. WorkDrive, mail attachments).

In a specific implementation, each card in the body area is self-explanatory, due to distinct visual identity; the contents of the cards are obvious to an observer. There is no need to read the contents of the card to know the functions. Hence a consistent UI for every entity is provided in this specific implementation to offer a uniform experience to the user across entities in a unified software suite.

Figure 19:
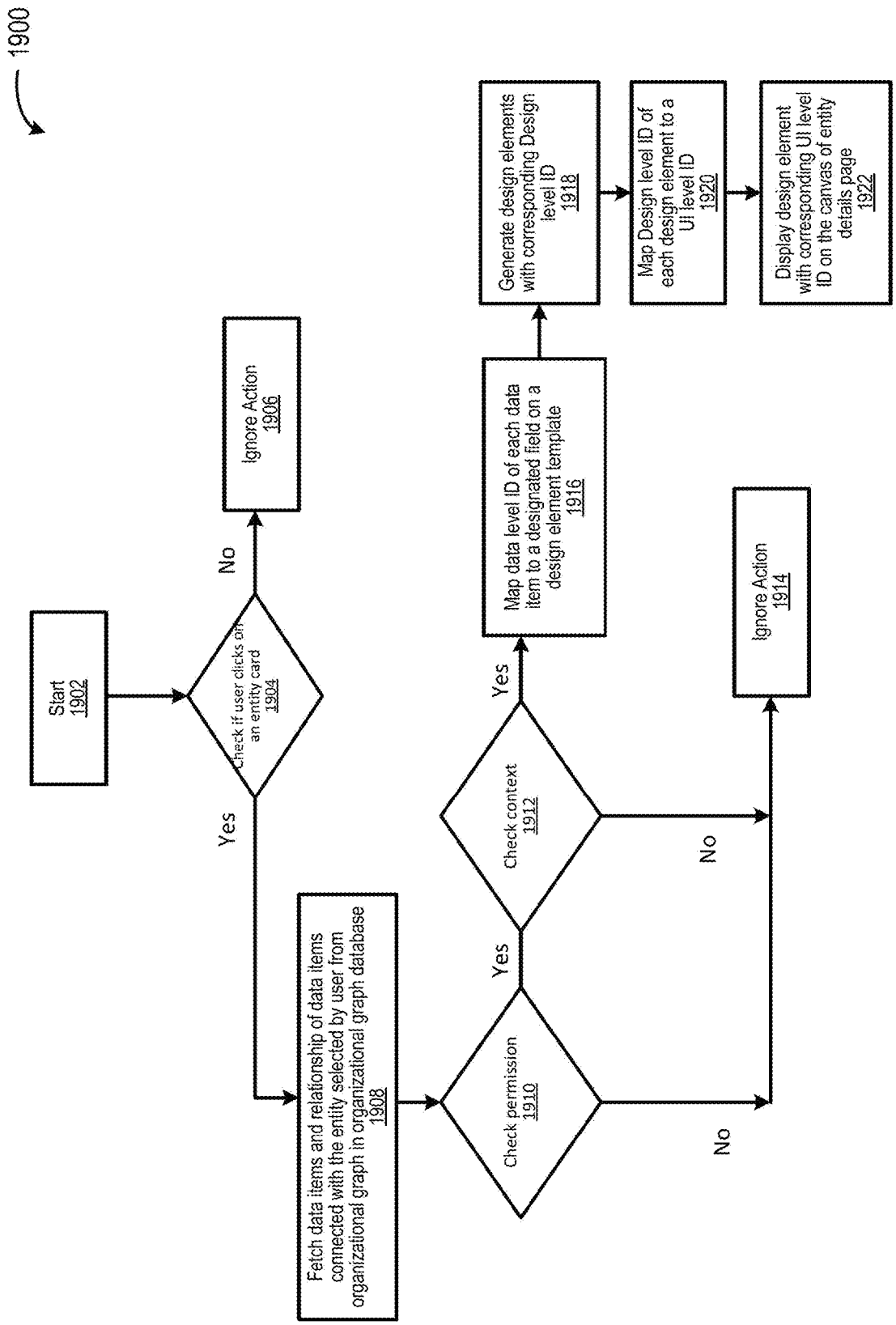
FIG. 19 is a flowchart of an example of a method for displaying information on an entity details screen.

FIG. 19 is a flowchart 1900 of an example of a method for displaying information on an entity details screen. The flowchart 1900 starts at module 1902 and continues to decision point 1904 with checking whether a user clicks on an entity card; if not (1904—No), the flowchart ends at module 1906 for the purpose of this example. Otherwise (1904—Yes), the flowchart 1900 continues to module 1908 with fetching data items and relationship of data items connected with the entity selected by the user from an organizational graph in the organizational graph datastore. When the user selects or clicks on any entity card, the user navigates to an applicable entity details page and an organization graph engine retrieves data items or records, from an organizational graph in an organizational graph datastore, corresponding to the entity card selected by the user; the organizational graph engine also retrieves relationships or connections of the selected entity with other connected entities in the organizational graph.

The flowchart 1900 continues to decision point 1910 with checking permission and to decision point 1912 with checking context; if no (1910—No or 1912—No), the flowchart ends at module 1914 for the purpose of this example. The context and access permission is determined by the contextualization engine and access control engine to ensure if the retrieved data items and their relationship from organizational graph, can be displayed on the body area. The contextualization engine and access control engine help decide what will ultimately be displayed.

The access permission defines "What the user has access to?" or "Who is accessing the data?". This defines the permission level of the user to view the data displayed on a page. The access control engine determines the permissions of every user. The access permission depends on factors that include hierarchy level of the user in the organization, time zone or location of the user, and/or privacy related permissions.

For example user 1, user 2 and user 3 can navigate to a page, e.g., an employee page. Each user can see the employee page but the data displayed on the employee page differs for each user depending on the hierarchy level of the user in the organization. There will be some data which are common. There could be some additional data which is viewed by one of the users, say user 1, but not by user 2 and user 3. This proves that user 1 has permission to access that particular data than the user2 and user 3. As an example, a sales engineer may work on a deal with a customer. While a sales person may work on multiple deals with the same customer. Both may access the deals details page. On the deals details page, the sales engineer can view the card of only the customer they are engaged with while sales person may view multiple cards related to multiple customers they are engaged with. Assume that the sales person is provided with incentives for closing the deals. In such a case, the sales person can view cards related to incentive values on the deals details page while this may not be viewed by the sales engineer.

As another example, consider user 1, user 2 and user 3 can navigate to a page, e.g., a customer page. Now say user 1 has access to view the details like revenue generated by a customer 1 in a geographical location (or time zone) 1, e.g., the USA. But user 1 may not have access to view the details like revenue generated by a customer 2 in a geographical location 2, e.g., Europe. This acts as an additional filter to serve privacy policies of various countries and check the access to the data accordingly.

An employee represented as an entity can choose who can access the personal information provided by them to the organization. The employee can also decide on who can access the personal information, which is represented as a privacy-related permission relationship between the employee entity and other entities. For instance if an employee entity has shared his/her Date of Birth (DoB) and decided that it could be accessed only by Human Resource (HR) manager alone, then the DoB of the employee can be accessed only by the HR manger. Others who require access to the DoB must request the employee for granting the access permission. Access log also plays a role here by providing the information regarding the entities which have accessed the personal information. In case any of the activity which tries to export the personal information out of the system, then it can be locked until the employee entity wishes to share the personal information.

The context defines "Where the user is coming/navigate from?" or "How are they accessing it?". The contextualization engine determines the origin of the user or finds the answer to the question "Where is the user from?" and builds the context dynamically. Where a user comes from determines what the user is going to view. The contextualization engine builds the context which is a compound aggregate of sub-contexts such as time zone or geographical location of the user, navigation patterns of the user, personalized or preferential context, and/or privacy-related context.

For example, the current location of the user to analyze the place or time zone, from where the user is requesting access, could be determined. Example: Consider two users user 1 and user 2 from different time zones. Then the cards could be displayed in day mode or night mode, based on the time zone of the user. Similarly, time zone plays a crucial role in representing dates (DD/MM/YYYY, YYYY/MM/DD), time format (12 hours, 24 hours) etc.

As another example, navigation between pages or screens or entity details or lists could be determined. As an example, consider a user belonging to, say, the Human Resource department. This user can navigate to the employee details page from say Payments page or from the Entity List page. The details displayed on the entity details page when the user navigates and reaches it from the Entity List page will be different from the details displayed on the entity details page when the user navigates and reaches it from the Payments page. This difference is due to the change in the navigation context.

The navigation could also be from an entity for example an application used for communication purposes. Assume a scenario when a user is communicating or chatting with a customer using a software application for communication. Now the communication itself becomes a context to the customer and the customer becomes a context to the communication.

Customizations required by user according to his/her personal preferences (due to age factor, a disability like color blindness, etc.) like font size, color themes, etc., could be determined. For a user with a disability like color blindness, the UI level ID of the cards will be different when compared to the UI level ID of the cards displayed for a normal user without any disability.

Accessing details of each entity based on a static permission set by the entity itself could be determined. The static permissions set by the entity are stored in a data storage. For example an entity say employee can decide on what personal information he/she can provide to the organization. If the organization entity does not have a static permission and still tries to access the personal information of the employee, then the employee is immediately notified about this to seek his/her permission in real time. Usually data protection regulations like GDPR mandate these kind of privacy preservation policies for customers. The proposed unified software suite not only offers such benefits to customer entity alone. It is possible to preserve the privacy of any persona-based entities like employees, contacts, etc.

Referring once again to the example of FIG. 19, after checking permissions and context (1910—Yes and 1912—Yes), the flowchart 1900 continues to module 1916 with mapping data level ID of each data item to a designated field of a design element template. In a specific implementation, data items or records are retrieved from the organizational graph by the organizational graph engine and, based on the access permission and context determined by the contextualization engine and access control engine, the data items or records are mapped to the design element (e.g., card).

The flowchart 1900 continues to module 1918 with generating design elements with corresponding design level ID. In a specific implementation, each card has a card ID which is a design level ID.

The flowchart 1900 continues to module 1920 with mapping design level ID of each design element to a UI level ID. In a specific implementation, the design level ID of each card is mapped to a UI level ID based on the context and user access permissions to provide appropriate display patterns.

The flowchart 1900 continues to module 1922 with displaying the design element with corresponding UI level ID on an entity details screen. In a specific implementation, the entity details screen displays highlights of information corresponding to the underlying connection of the entity, selected by user, with other entities in an organizational graph.

In a specific implementation, cards with a similar context are collected to generate lists. These lists can be ordered based on their context. For example, lists matching persona-based context appear in the left-most column, lists matching activity-based context appear in the middle column, and lists matching resource-based context appear in the right-most column of the body area of an entity details screen, as shown in FIG. 15. The lists can be displayed as collapsible lists in which the cards are stacked on each other. Some relationships may be listed on the entity details screen, while others may be hidden and displayed on request from the user. There are several other custom layouts which could be picked or defined by an administrator.

In a specific implementation, contents displayed on the entity details screen of a particular entity are different from the contents displayed on the entity details screen of another entity. The UI level ID of the cards can also vary while displaying the contents on the entity details screen for each entity. This is due at least in part to the change in context and access permission for different entities as determined by the contextualization engine and access control engine.

Figure 20:
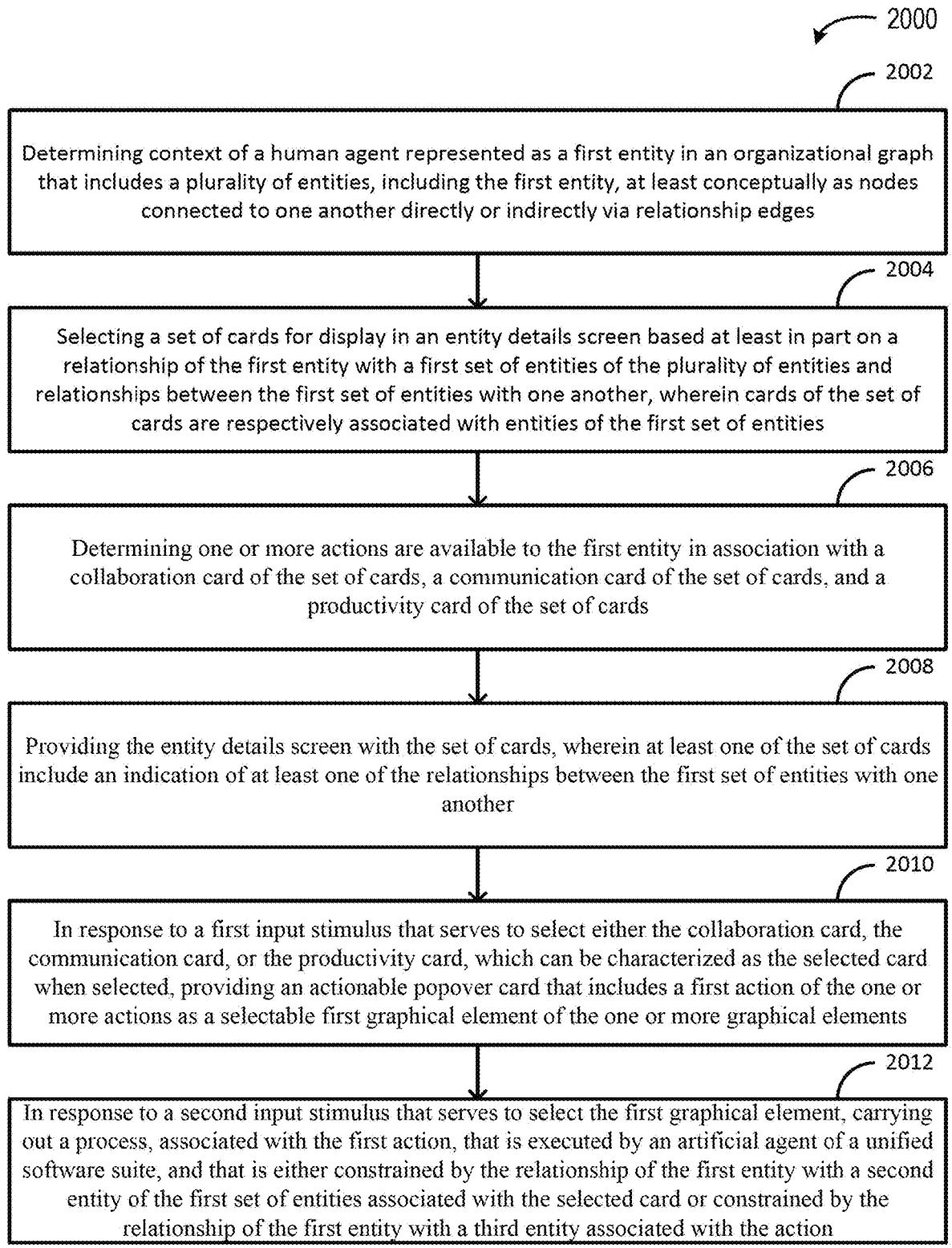
FIG. 20 is a flowchart of an example of a method for entity card utilization.

FIG. 20 is a flowchart 2000 of an example of a method for entity card utilization. The flowchart 2000 starts at module 2002 with determining context of a human agent represented as a first entity in an organizational graph that includes a plurality of entities, including the first entity, at least conceptually as nodes connected to one another directly or indirectly via relationship edges. In a specific implementation, a contextualization engine determines the context of the human agent; the context of the human agent is selected from a group of context variables consisting of a time zone attributed to the human agent, a geographical location attributed to the human agent, a navigation pattern attributed to the human agent, personalization parameters of the first entity, preferential parameters of the first entity, privacy associated with the second entity, and a combination of these. In a specific implementation, an access control engine determines access permissions of the first entity; the relationship edges include a permission selected from the group consisting of hierarchy level of the first entity within an organization utilizing the unified software suite, a time zone attributed to the human agent, a geographical location attributed to the human agent, privacy associated with the second entity, and a combination of these. In a specific implementation, the organization graph is maintained using a 3-tier architecture comprising a User Interface (UI) layer, a process layer, and a data layer.

The flowchart 2000 continues to module 2004 with selecting a set of cards for display in an entity details screen based at least in part on a relationship of the first entity with a first set of entities of the plurality of entities and relationships between the first set of entities with one another, wherein cards of the set of cards are respectively associated with entities of the first set of entities. In a specific implementation, the method includes mapping a data level identifier (ID) of a data item or its relationship to a designated field on a design element template; generating a design element with a corresponding design level ID; mapping the design level ID of the design element to a UI level ID; and providing the data item in summary with the UI level ID to the entity details screen. In another specific implementation, the method includes retrieving, via a contextualization engine and an access control engine, data items from a data layer that are mapped to the collaboration card, the communication card, or the productivity card to provide the collaboration card, the communication card, or the productivity card a card identification (ID) and User Interface (UI) level ID that are unique to the first entity of the plurality of entities.

The flowchart 2000 continues to module 2006 with determining one or more actions are available to the first entity in association with a collaboration card of the set of cards, a communication card of the set of cards, and a productivity card of the set of cards. In a specific implementation, the collaboration card is selected from a group of cards consisting of a task card, an event card, an activity card, and a combination of these. In a specific implementation, the communication card is selected from a group of cards consisting of an email card, a chat card, an audio card, a video card, a meeting card, and a combination of these. In a specific implementation, the productivity card is selected from a group of cards consisting of a feed card, a file card, a forum card, and a combination of these. The collaboration card, the communication card, or the productivity card can include a snapshot card. The collaboration card, the communication card, or the productivity card can include a live insight card.

The flowchart 2000 continues to module 2008 with providing the entity details screen with the set of cards, wherein at least one of the set of cards include an indication of at least one of the relationships between the first set of entities with one another. In a specific implementation, the human agent experiences a uniform design regardless of whether the process is carried out by a first application or a second application of the unified software suite. In a specific implementation, the method includes determining connections between the second entity and multiple ones of the plurality of entities and providing to the entity details screen activities involving the second entity corresponding to relationships with a second set of the plurality of entities, wherein cards with similar context are grouped into lists.

The flowchart 2000 continues to module 2010 with, in response to a first input stimulus that serves to select either the collaboration card, the communication card, or the productivity card, which can be characterized as the selected card when selected, providing an actionable popover card that includes a first action of the one or more actions as a selectable first graphical element of the one or more graphical elements. In a specific implementation, the method can include displaying a second graphical element, wherein selecting the second graphical element launches side talk, which communicationally connects the human agent to an agent of the second entity or an agent of the third entity. In another specific implementation, the method can include displaying a second graphical element, wherein selecting the second graphical element launches side talk, which communicationally connects the human agent with a human agent of the second entity or the third entity in association with the selected card.

The flowchart 2000 continues to module 2012 with, in response to a second input stimulus that serves to select the first graphical element, carrying out a process, associated with the first action, that is executed by an artificial agent of a unified software suite, and that is either constrained by the relationship of the first entity with a second entity of the first set of entities associated with the selected card or constrained by the relationship of the first entity with a third entity associated with the action.

What is claimed is:

1. A system comprising one or more processors and memory storing instructions that, when executed by the one or more processors, cause the system to perform:
   determining context of a human agent represented as a first entity in an organizational graph that includes a plurality of entities, including the first entity, at least conceptually as nodes connected to one another directly or indirectly via relationship edges;
   selecting a set of cards for display in an entity details screen based at least in part on a relationship of the first entity with a first set of entities of the plurality of entities and relationships between the first set of entities with one another, wherein cards of the set of cards are respectively associated with entities of the first set of entities;
   determining one or more actions are available to the first entity in association with a collaboration card of the set of cards, a communication card of the set of cards, and a productivity card of the set of cards, wherein the collaboration card, the communication card, or the productivity card includes an artificial intelligence tag that is generated by an artificial intelligence analytics engine providing live insights on entity metadata associated with the first entity;
   providing the entity details screen with the set of cards, wherein at least one of the set of cards include an indication of at least one of the relationships between the first set of entities with one another;
   in response to a first input stimulus that serves to select either the collaboration card, the communication card, or the productivity card which can be characterized as the selected card when selected, providing an actionable popover card, in response to hovering over the artificial intelligence tag, the actionable popover card providing the live insights on the entity metadata associated with the first entity, that includes a first action of the one or more actions as a selectable first graphical element of one or more graphical elements;
   in response to a second input stimulus that serves to select the first graphical element, carrying out a process, associated with the first action, that is executed by an artificial agent of a unified software suite, and that is either constrained by a relationship of the first entity with a second entity of the first set of entities associated with the selected card or constrained by a relationship of the first entity with a third entity associated with the action.

2. The system of claim 1, wherein the context of the human agent is selected from a group of context variables consisting of a time zone attributed to the human agent, a geographical location attributed to the human agent, a navigation pattern attributed to the human agent, personalization parameters of the first entity, preferential parameters of the first entity, privacy associated with the second entity, and a combination of these.

3. The system of claim 1, wherein the relationship edges include a permission selected from a group consisting of hierarchy level of the first entity within an organization utilizing the unified software suite, a time zone attributed to the human agent, a geographical location attributed to the human agent, privacy associated with the second entity, and a combination of these.

4. The system of claim 1, wherein the collaboration card is selected from a group of cards consisting of a task card, an event card, an activity card, and a combination of these.

5. The system of claim 1, wherein the communication card is selected from a group of cards consisting of an email card, a chat card, an audio card, a video card, a meeting card, and a combination of these.

6. The system of claim 1, wherein the productivity card is selected from a group of cards consisting of a feed card, a file card, a forum card, and a combination of these.

7. The system of claim 1, wherein the collaboration card, the communication card, or the productivity card includes a snapshot card.

8. The system of claim 1, wherein the collaboration card, the communication card, or the productivity card includes a live insight card.

9. The system of claim 1, wherein the collaboration card, the communication card, or the productivity card includes a dynamic tag that is generated by an analytics engine.

10. The system of claim 1, wherein the human agent experiences a uniform design regardless of whether the process is carried out by a first application or a second application of the unified software suite.

11. The system of claim 1, wherein the organization graph is maintained using a 3-tier architecture comprising a User Interface (UI) layer, a process layer, and a data layer.

12. The system of claim 1, wherein a contextualization engine determines the context of the human agent.

13. The system of claim 1, wherein an access control engine determines access permissions of the first entity.

14. The system of claim 1, comprising, as part of the process, instructions for retrieving, via a contextualization engine and an access control engine, data items from a data layer that are mapped to the collaboration card, the communication card, or the productivity card to provide the collaboration card, the communication card, or the productivity card with a card identification (ID) and User Interface (UI) level ID that are unique to the first entity of the plurality of entities.

15. The system of claim 1 comprising instructions for displaying a second graphical element, wherein selecting the second graphical element launches side talk, which communicationally connects the human agent to an agent of the second entity or an agent of the third entity.

16. The system of claim 1 comprising instructions for displaying a second graphical element, wherein selecting the second graphical element launches side talk, which communicationally connects the human agent with a human agent of the second entity or the third entity in association with the selected card.

17. The system of claim 1 comprising instructions for determining connections between the second entity and multiple ones of the plurality of entities and providing to the entity details screen activities involving the second entity corresponding to relationships with a second set of the plurality of entities, wherein cards with similar context are grouped into lists.

18. The system of claim 1 comprising instructions for:
mapping a data level identifier (ID) of a data item to a designated field on a design element template;
generating a design element with a corresponding design level ID;
mapping the design level ID of the design element to a UI level ID;
providing the design element with the UI level ID to the entity details screen.

19. A method comprising:
determining context of a human agent represented as a first entity in an organizational graph that includes a plurality of entities, including the first entity, at least conceptually as nodes connected to one another directly or indirectly via relationship edges;
selecting a set of cards for display in an entity details screen based at least in part on a relationship of the first entity with a first set of entities of the plurality of entities and relationships between the first set of entities with one another, wherein cards of the set of cards are respectively associated with entities of the first set of entities;
determining one or more actions are available to the first entity in association with a collaboration card of the set of cards, a communication card of the set of cards, and a productivity card of the set of cards, wherein the collaboration card, the communication card, or the productivity card includes an artificial intelligence tag that is generated by an artificial intelligence analytics engine providing live insights on entity metadata associated with the first entity;
providing the entity details screen with the set of cards, wherein at least one of the set of cards include an indication of at least one of the relationships between the first set of entities with one another;
in response to a first input stimulus that serves to select either the collaboration card, the communication card, or the productivity card, which can be characterized as the selected card when selected, providing an actionable popover card in response to hovering over the artificial intelligence tag, the actionable popover card providing the live insights on the entity metadata associated with the first entity, that includes a first action of the one or more actions as a selectable first graphical element of one or more graphical elements;
in response to a second input stimulus that serves to select the first graphical element, carrying out a process, associated with the first action, that is executed by an artificial agent of a unified software suite, and that is either constrained by a relationship of the first entity with a second entity of the first set of entities associated with the selected card or constrained by a relationship of the first entity with a third entity associated with the action.

20. A system comprising:
a means for determining context of a human agent represented as a first entity in an organizational graph that includes a plurality of entities, including the first entity, at least conceptually as nodes connected to one another directly or indirectly via relationship edges;
a means for selecting a set of cards for display in an entity details screen based at least in part on a relationship of the first entity with a first set of entities of the plurality of entities and relationships between the first set of entities with one another, wherein cards of the set of cards are respectively associated with entities of the first set of entities;
a means for determining one or more actions are available to the first entity in association with a collaboration card of the set of cards, a communication card of the set of cards, and a productivity card of the set of cards, wherein the collaboration card, the communication card, or the productivity card includes an artificial intelligence tag that is generated by an artificial intelligence analytics engine providing live insights on entity metadata associated with the first entity;
a means for providing the entity details screen with the set of cards, wherein at least one of the set of cards include an indication of at least one of the relationships between the first set of entities with one another;
a means for, in response to a first input stimulus that serves to select either the collaboration card, the communication card, or the productivity card, which can be characterized as the selected card when selected, providing an actionable popover card in response to hovering over the artificial intelligence tag, the actionable popover card providing the live insights on the entity metadata associated with the first entity, that includes a first action of the one or more actions as a selectable first graphical element of one or more graphical elements;

a means for, in response to a second input stimulus that serves to select the first graphical element, carrying out a process, associated with the first action, that is executed by an artificial agent of a unified software suite, and that is either constrained by a relationship of the first entity with a second entity of the first set of entities associated with the selected card or constrained by a relationship of the first entity with a third entity associated with the action.

\* \* \* \* \*